United States Patent
Annapragada

(10) Patent No.: US 8,386,532 B2
(45) Date of Patent: Feb. 26, 2013

(54) MECHANISM FOR CO-LOCATED DATA PLACEMENT IN A PARALLEL ELASTIC DATABASE MANAGEMENT SYSTEM

(75) Inventor: Mrithyunjaya Annapragada, Bolton, MA (US)

(73) Assignee: Parelastic Corporation, Waltham, MA (US)

( * ) Notice: Subject to any disclaimer, the term of this patent is extended or adjusted under 35 U.S.C. 154(b) by 0 days.

(21) Appl. No.: 13/459,413

(22) Filed: Apr. 30, 2012

(65) Prior Publication Data

US 2012/0246194 A1 Sep. 27, 2012

Related U.S. Application Data

(63) Continuation of application No. 13/253,222, filed on Oct. 5, 2011, now abandoned.

(60) Provisional application No. 61/406,816, filed on Oct. 26, 2010.

(51) Int. Cl.
*G06F 7/00* (2006.01)

(52) U.S. Cl. ........ 707/802; 707/609; 707/790; 707/791; 707/792; 707/803; 709/201; 709/220; 709/223; 710/8; 710/104

(58) Field of Classification Search .................... None
See application file for complete search history.

(56) References Cited

U.S. PATENT DOCUMENTS

| | | | | |
|---|---|---|---|---|
| 5,590,319 A * | 12/1996 | Cohen et al. | ........................... | 1/1 |
| 5,630,124 A * | 5/1997 | Coyle et al. | ........................... | 1/1 |
| 5,813,005 A * | 9/1998 | Tsuchida et al. | ........................... | 1/1 |
| 5,878,409 A * | 3/1999 | Baru et al. | ........................... | 1/1 |
| 6,081,801 A * | 6/2000 | Cochrane et al. | ........................... | 1/1 |
| 6,101,495 A * | 8/2000 | Tsuchida et al. | ........................... | 1/1 |
| 6,112,198 A * | 8/2000 | Lohman et al. | ........................... | 1/1 |
| 6,405,198 B1 * | 6/2002 | Bitar et al. | ........................... | 1/1 |
| 6,633,883 B2 * | 10/2003 | Koskas | ........................... | 1/1 |
| 6,711,563 B1 * | 3/2004 | Koskas | ........................... | 707/769 |
| 6,745,191 B2 * | 6/2004 | Kasao et al. | ........................... | 1/1 |
| 6,952,692 B1 * | 10/2005 | Bhattiprolu et al. | .......... | 707/704 |
| 6,999,967 B1 * | 2/2006 | Ghazal et al. | ........................... | 1/1 |
| 7,433,863 B2 * | 10/2008 | Zane et al. | ........................... | 1/1 |
| 7,634,477 B2 * | 12/2009 | Hinshaw | ........................... | 1/1 |
| 7,702,616 B1 * | 4/2010 | Li et al. | .................. | 707/999.002 |
| 8,126,870 B2 * | 2/2012 | Chowdhuri et al. | .......... | 707/713 |
| 8,166,022 B2 * | 4/2012 | Han et al. | ........................... | 707/718 |
| 2001/0011268 A1 * | 8/2001 | Tsuchida et al. | .................. | 707/2 |
| 2002/0095421 A1 * | 7/2002 | Koskas | ........................... | 707/100 |
| 2002/0138559 A1 * | 9/2002 | Ulrich et al. | .................. | 709/203 |
| 2005/0081210 A1 * | 4/2005 | Day et al. | ........................... | 718/104 |

(Continued)

FOREIGN PATENT DOCUMENTS

WO WO 2007/038981 A1 4/2007

OTHER PUBLICATIONS

'DB2 Parallel Edition' IBM Systems Journal, vol. 34, No. 2, 1995, pp. 292-322.*

(Continued)

*Primary Examiner* — Steven Snyder
(74) *Attorney, Agent, or Firm* — Cesari & McKenna, LLP

(57) ABSTRACT

A database management system implemented in a cloud computing environment. Operational nodes are assigned as groups of controller-nodes, compute-nodes or storage-nodes. Assignments as compute-nodes or storage-nodes vary during execution of queries. Queries specify tables for an associated database operation, and respective storage nodegroup(s). The number of nodes executing a query may change by (a) changing a compute-nodegroup, or (b) adding or removing nodes from a compute nodegroup; and/or distributing data to the storage nodegroup based on a Distribution Method which may be specified by a Distribution Vector (DV) that determines at least where each row is stored.

19 Claims, 28 Drawing Sheets

A high level block diagram of a parallel elastic database management system, according to one embodiment.

U.S. PATENT DOCUMENTS

| | | | |
|---|---|---|---|
| 2005/0131893 A1* | 6/2005 | Von Glan | 707/5 |
| 2005/0289388 A1* | 12/2005 | Black-Ziegelbein et al. | 714/7 |
| 2008/0040348 A1* | 2/2008 | Lawande et al. | 707/7 |
| 2008/0288554 A1* | 11/2008 | Wilding et al. | 707/200 |
| 2008/0294648 A1* | 11/2008 | Lin et al. | 707/10 |
| 2009/0055348 A1* | 2/2009 | Wilding et al. | 707/1 |
| 2010/0014888 A1* | 1/2010 | Ikeda et al. | 399/159 |
| 2011/0047144 A1* | 2/2011 | Han et al. | 707/718 |
| 2011/0145239 A1* | 6/2011 | Newman et al. | 707/737 |
| 2011/0302583 A1 | 12/2011 | Abadi et al. | |
| 2012/0136904 A1* | 5/2012 | Venkata Naga Ravi | 707/803 |

OTHER PUBLICATIONS

Microsoft TechNet's 'SQL Server Megaservers: Scalability, Availability, Manageability' updated Mar. 31, 2003 shows a typical Shared Nothing cluster with multiple clients connecting into the system.*

Wikipedia's article on 'Database Management System' from Jul. 24, 2010.*

'Parallel Database Systems: The Future of High Performance Database Processing' by David J. DeWitt and Jim Gray, Communications of the ACM, vol. 36, No. 6, Jun. 1992.*

Gantz, et al. "Extracting Value from Chaos", IDC IVIEW, http://www.emc.com/digitial_universe, Jun. 28, 2011.

Stonebraker, M. "The Case for Shared Nothing", Database Engineering, 1986.

Dean, et al. "MapReduce: Simplified Data Processing on Large Clusters". 2004.

Shvachko, et al "The Hadoop Distributed File System" IEEE, 2010.

Hendrickson, S., "Getting Started with Hadoop with Amazon's Elastic MapReduce", Jul. 8, 2010.

Condie, et al. "MapReduce Online" 2010.

www.netezzacommunity com., Netezza Database User Guide, 20284-2, Rev. 1, Software Release, p. B-56; Dec. 7, 2009.

http://download.oracle.com/docs "Oracle Database Administrator's Guide" 10g Release 1 (10.1) Part No. B10739-01, section 16, partitioned tables and indexes. downloaded—Oct. 6, 2011.

http://aws.amazon.com/cc2/; Amazon Web Services, "Amazon Elastic Compute Cloud (Amazon EC2),"retrieved from internet Oct. 17, 2011.

Piech, M., et al. "Oracle Exalogic Elastic Cloud: A Brief Introduction," An Oracle White Paper, (Mar. 2011).

Baru, C.K., et al., "DB2 Parallel Edition" 8204 *IBM Systems Journal*, 34(2):292-322 (1995).

International Search Report and Written Opinion, issued in International Application No. PCT/US2011/057812; Date of completion of search: Dec. 23, 2011; 11 pages.

"IBM DB2 Parallel Edition for AIX, Program No. 5765-328", Dec. 1996, $2^{nd}$ Edition.

Online Aggregation and Continuous Query Support in MapReduce by Tyson Condie, Neil Conway, Peter Alvaro, Joseph M. Hellerstein, John Gerth, Justin Talbot, Khaled Elmeleegy, Russell Sears (hereafter Condie), Sigmod'10, Jun. 6-11, 2010, ACM 978-1-4503-0032—Feb. 10, 2006, pp. 1115-1118.

Amazon Elastic Compute Cloud (Amazon EC2), Aug. 21, 2009 (http://web.archive.org/web/20090921165120/http://aws.amazon.com/ec2/).

* cited by examiner

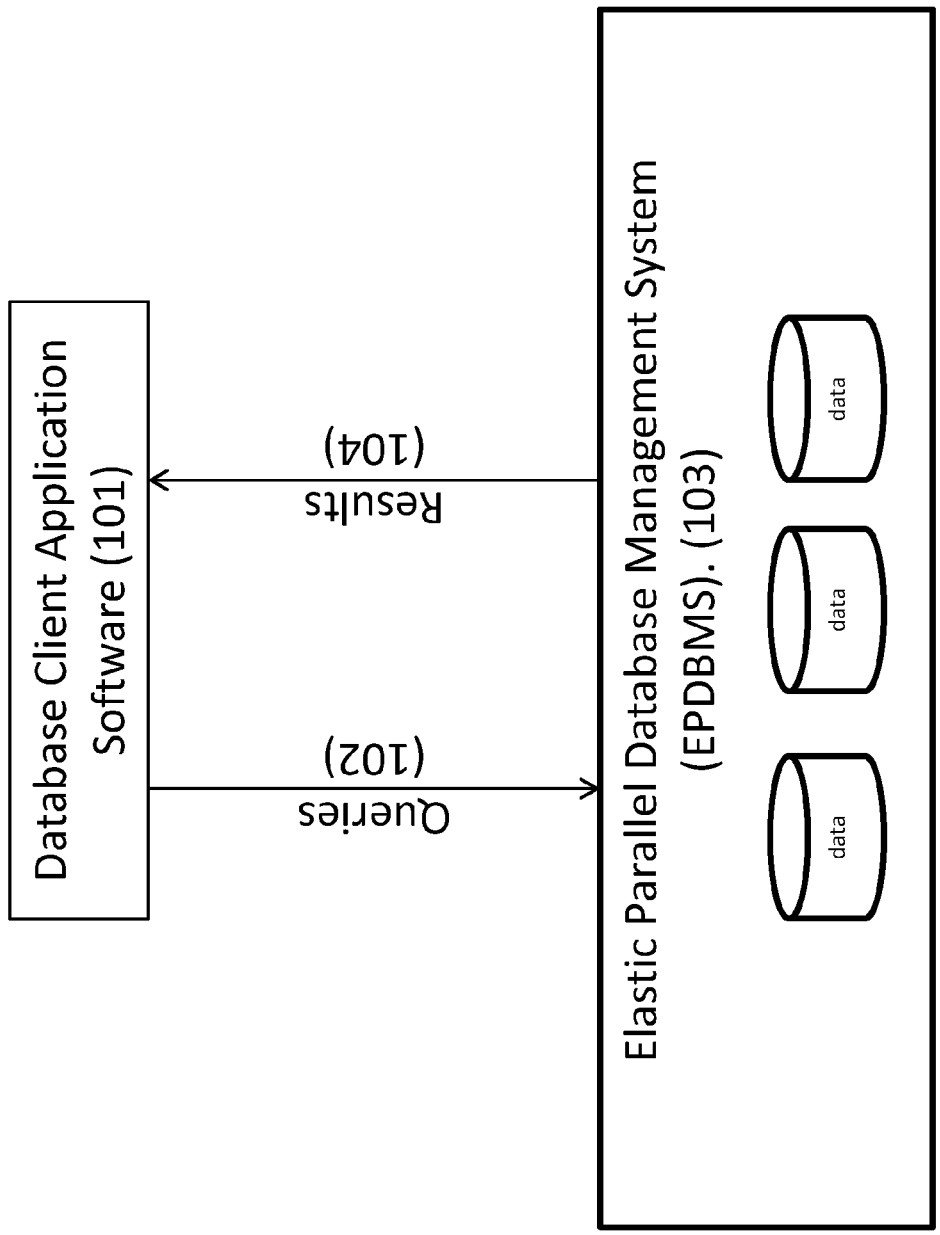
Figure 1. High level block diagram of the Elastic Parallel Database Management System (EPDBMS) and database client application software.

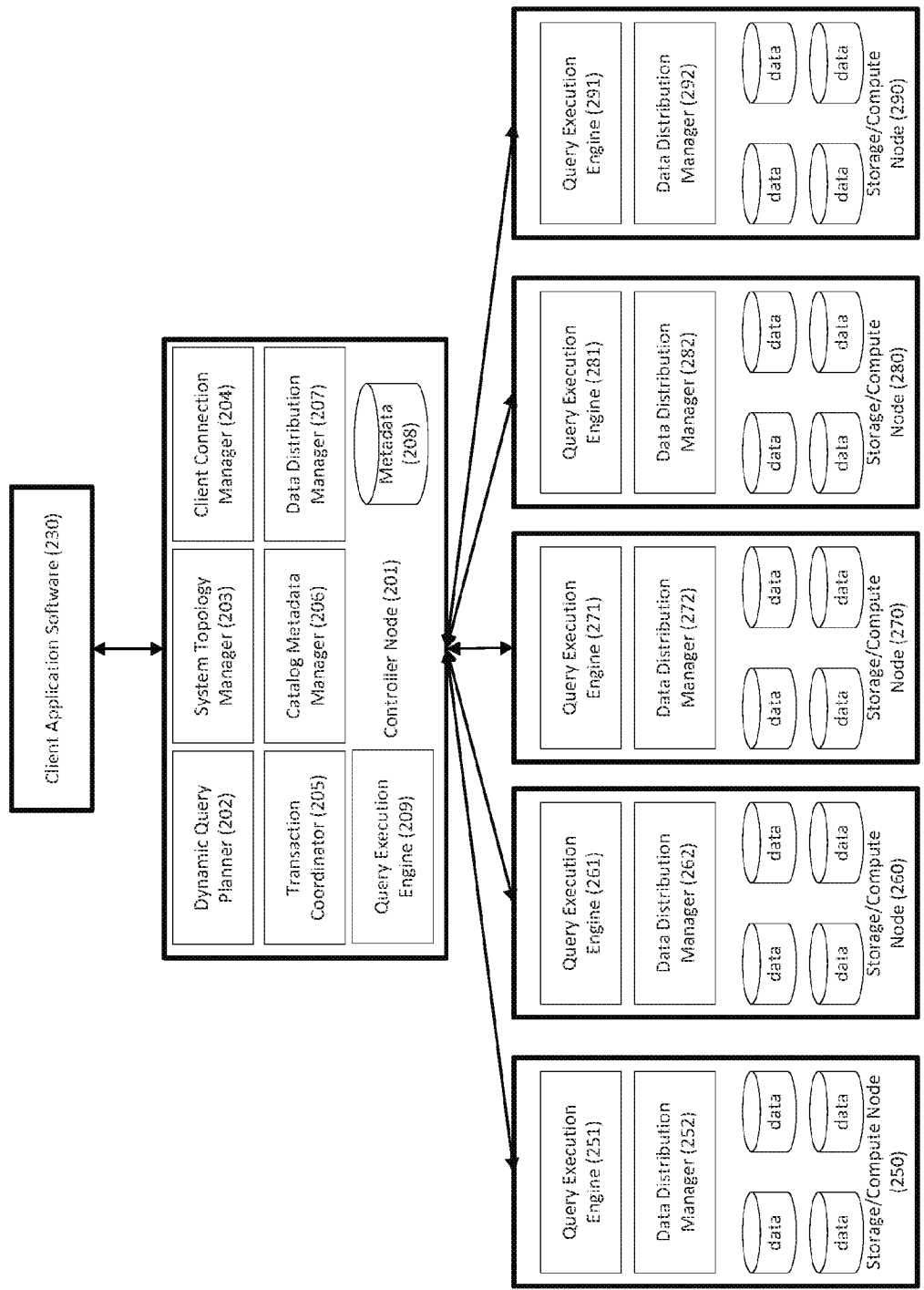
Figure 2. A high level block diagram of a parallel elastic database management system, according to one embodiment.

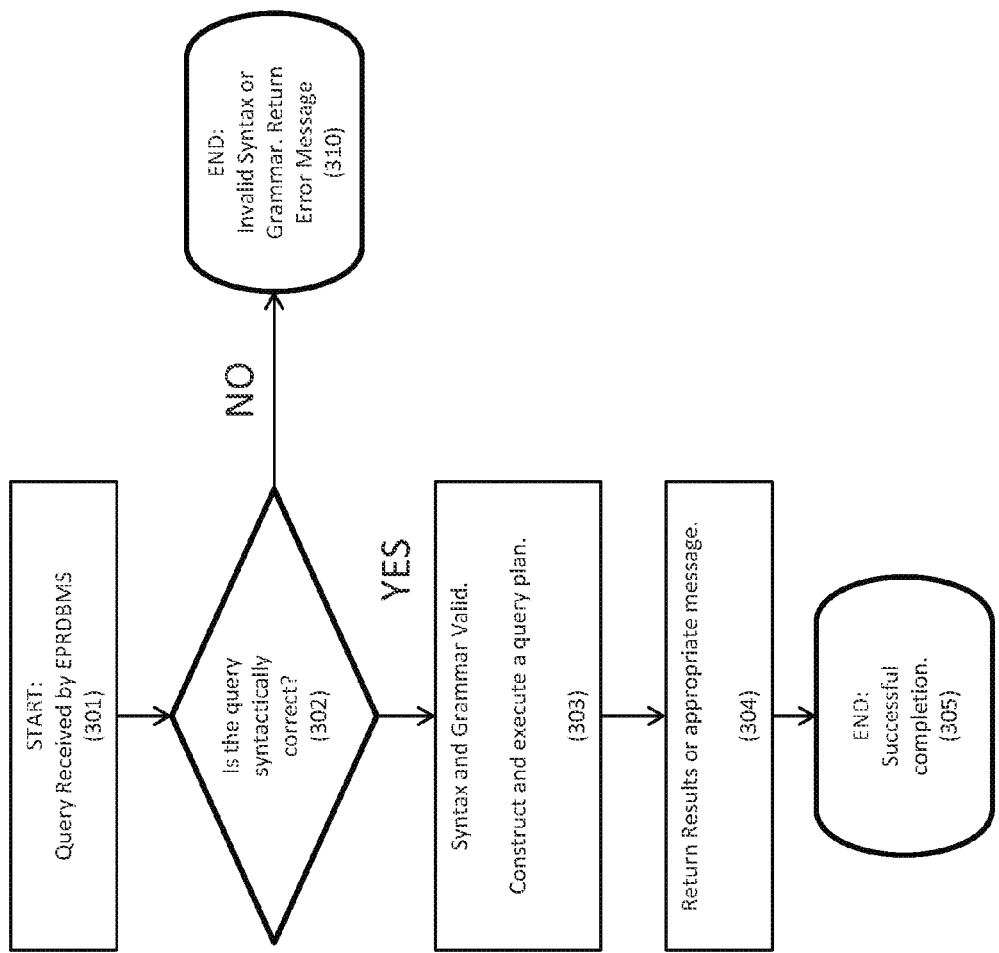
FIGURE 3. A BLOCK DIAGRAM DEPICTING THE HIGH LEVEL PROGRAM FLOW DURING QUERY EXECUTION, ACCORDING TO ONE EMBODIMENT.

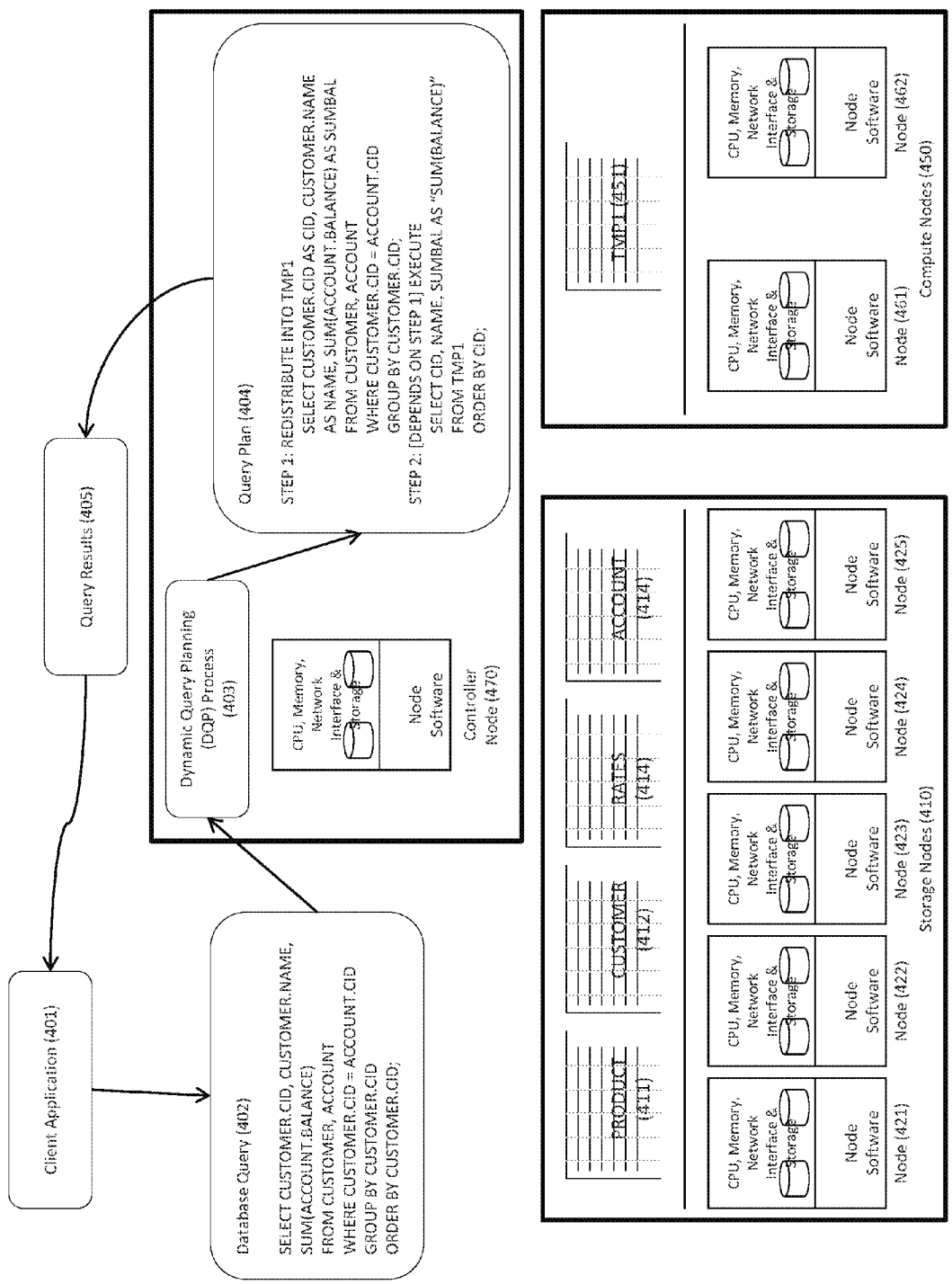
FIGURE 4. A HIGH LEVEL BLOCK DIAGRAM DEPICTING VARIOUS COMPONENTS AND ELEMENTS THAT ARE PART OF QUERY EXECUTION, ACCORDING TO ONE EMBODIMENT.

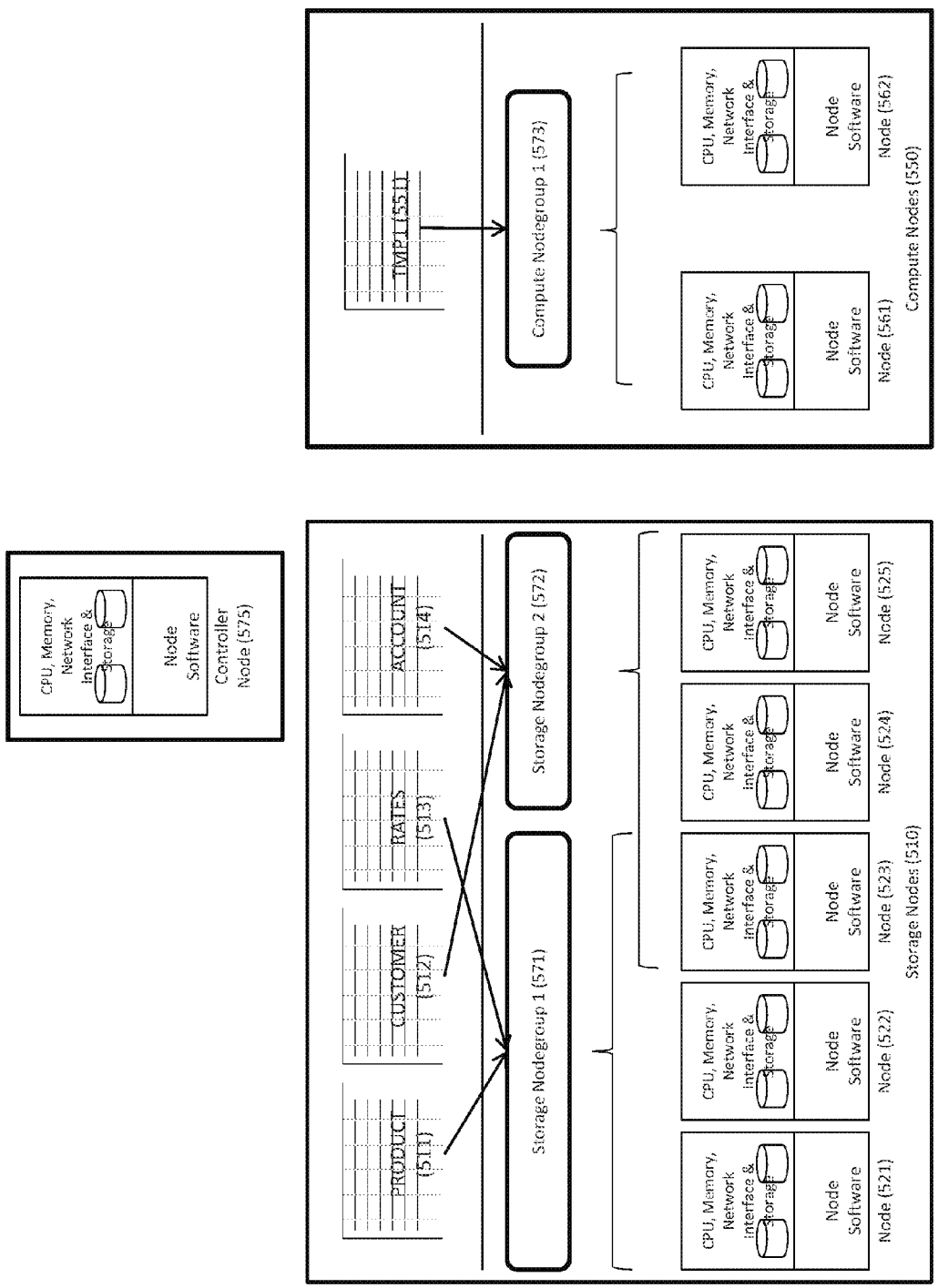
FIGURE 5. A HIGH LEVEL BLOCK DIAGRAM DEPICTING VARIOUS LOGICAL GROUPINGS OF NODES IN A SYSTEM, ACCORDING TO ONE EMBODIMENT.

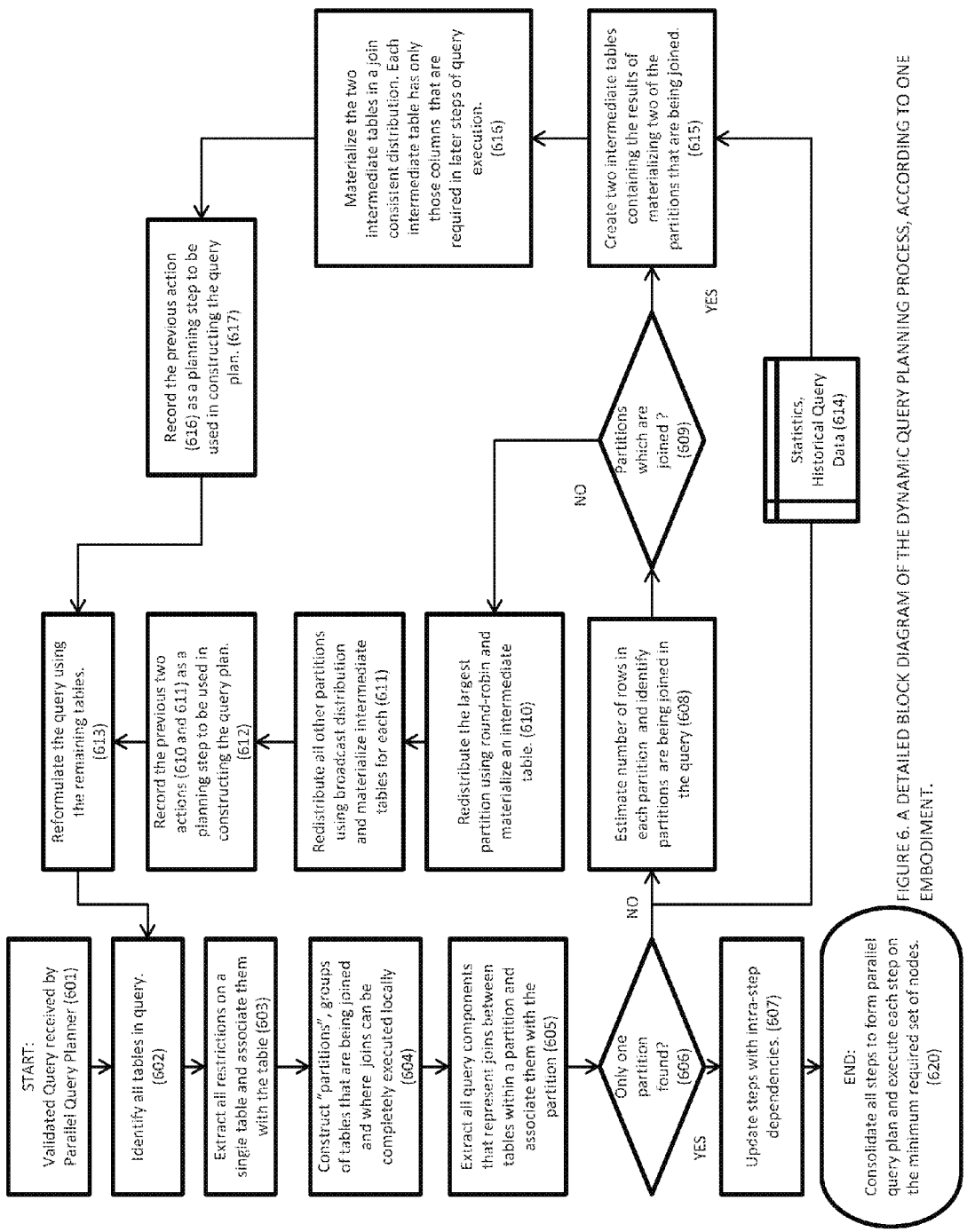
FIGURE 6. A DETAILED BLOCK DIAGRAM OF THE DYNAMIC QUERY PLANNING PROCESS, ACCORDING TO ONE EMBODIMENT.

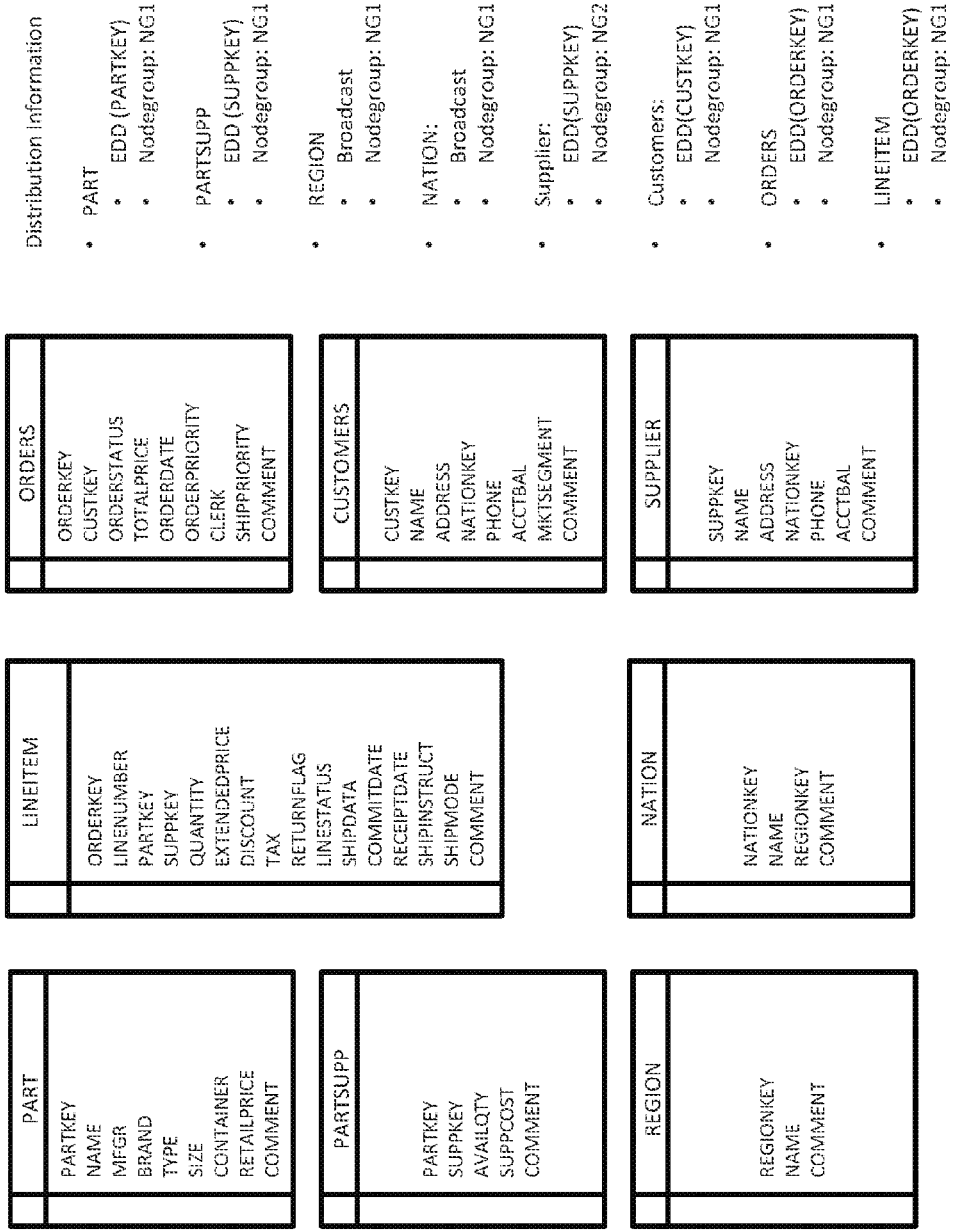
FIGURE 7. A SCHEMA TO ILLUSTRATE THE QUERY PLANNING PROCESS ACCORDING TO ONE EMBODIMENT.

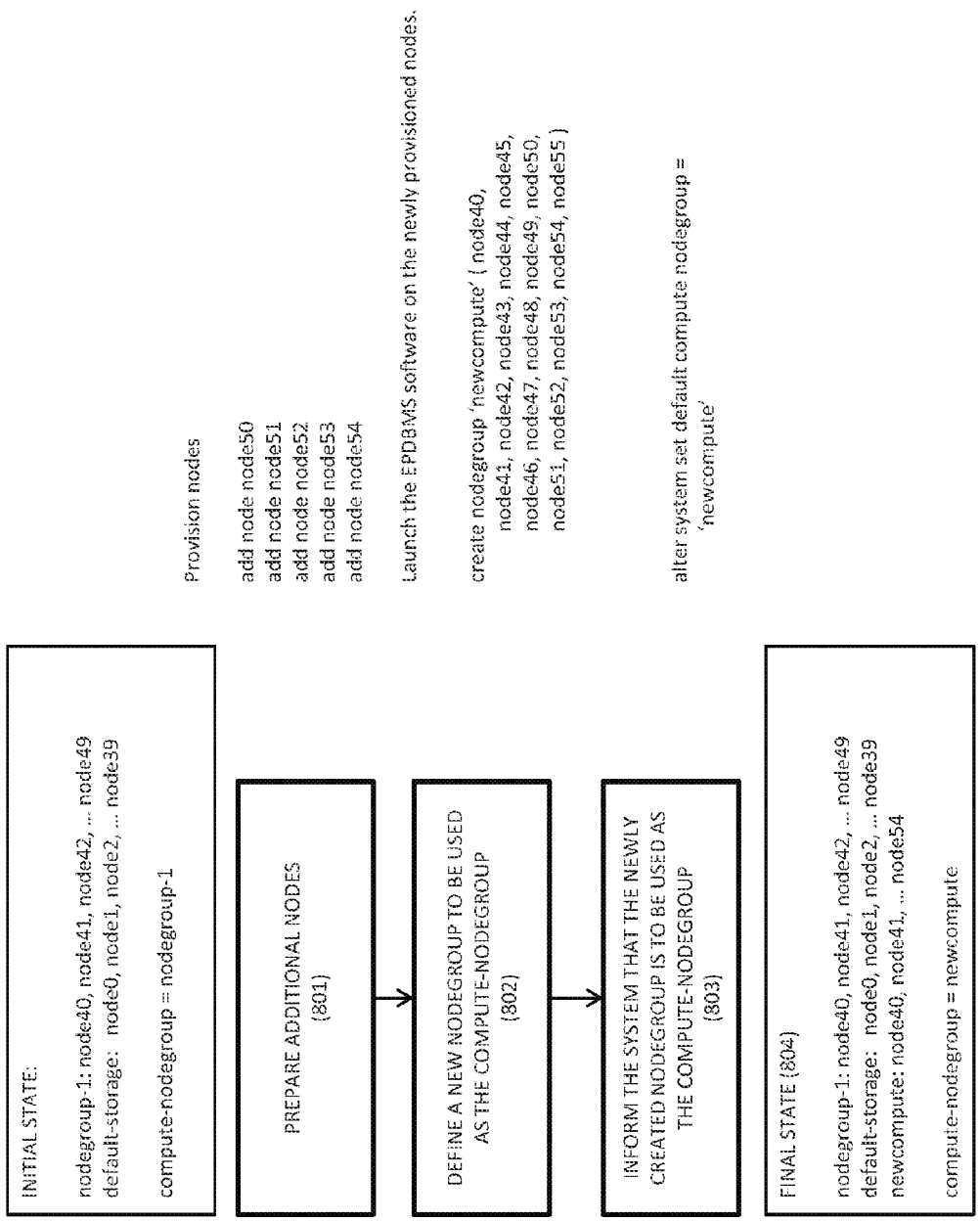
FIGURE 8. AN ILLUSTRATION OF THE STEPS INVOLVED IN ADDING COMPUTE CAPACITY TO THE SYSTEM, ACCORDING TO ONE EMBODIMENT.

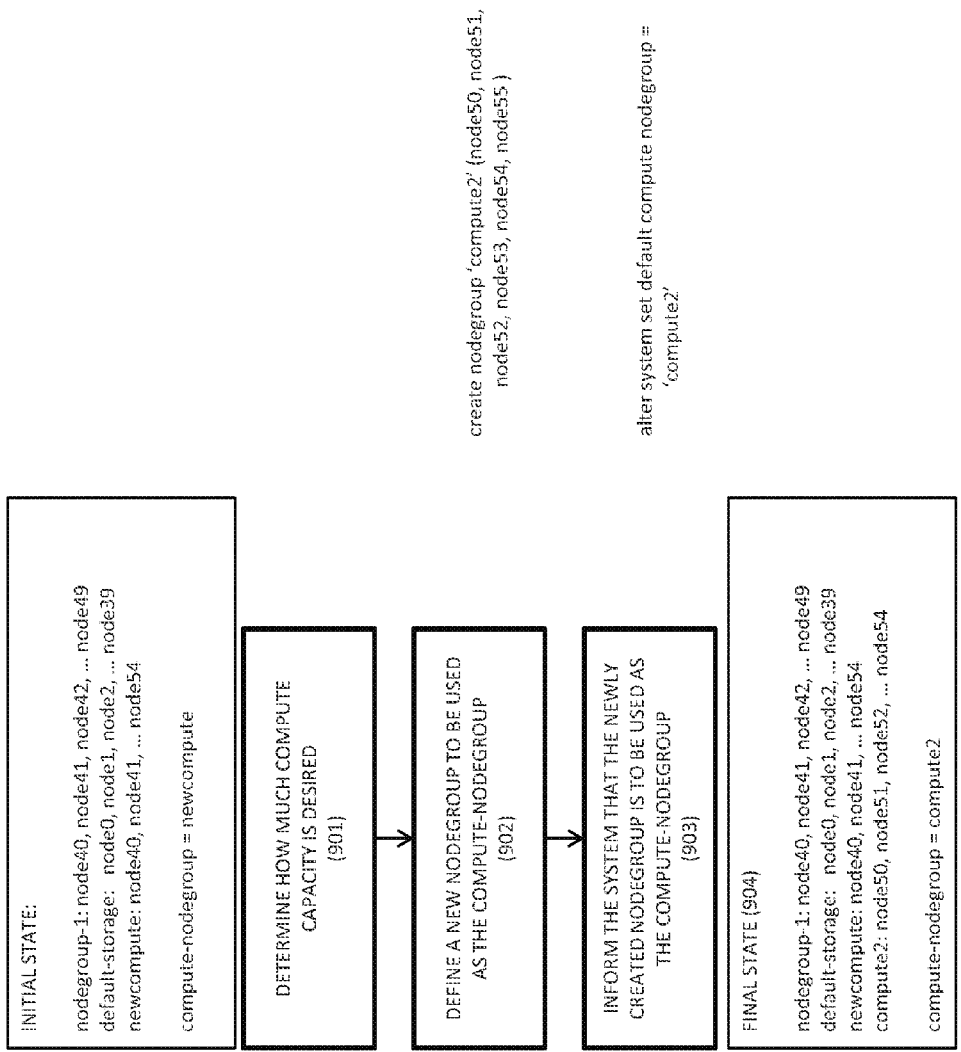

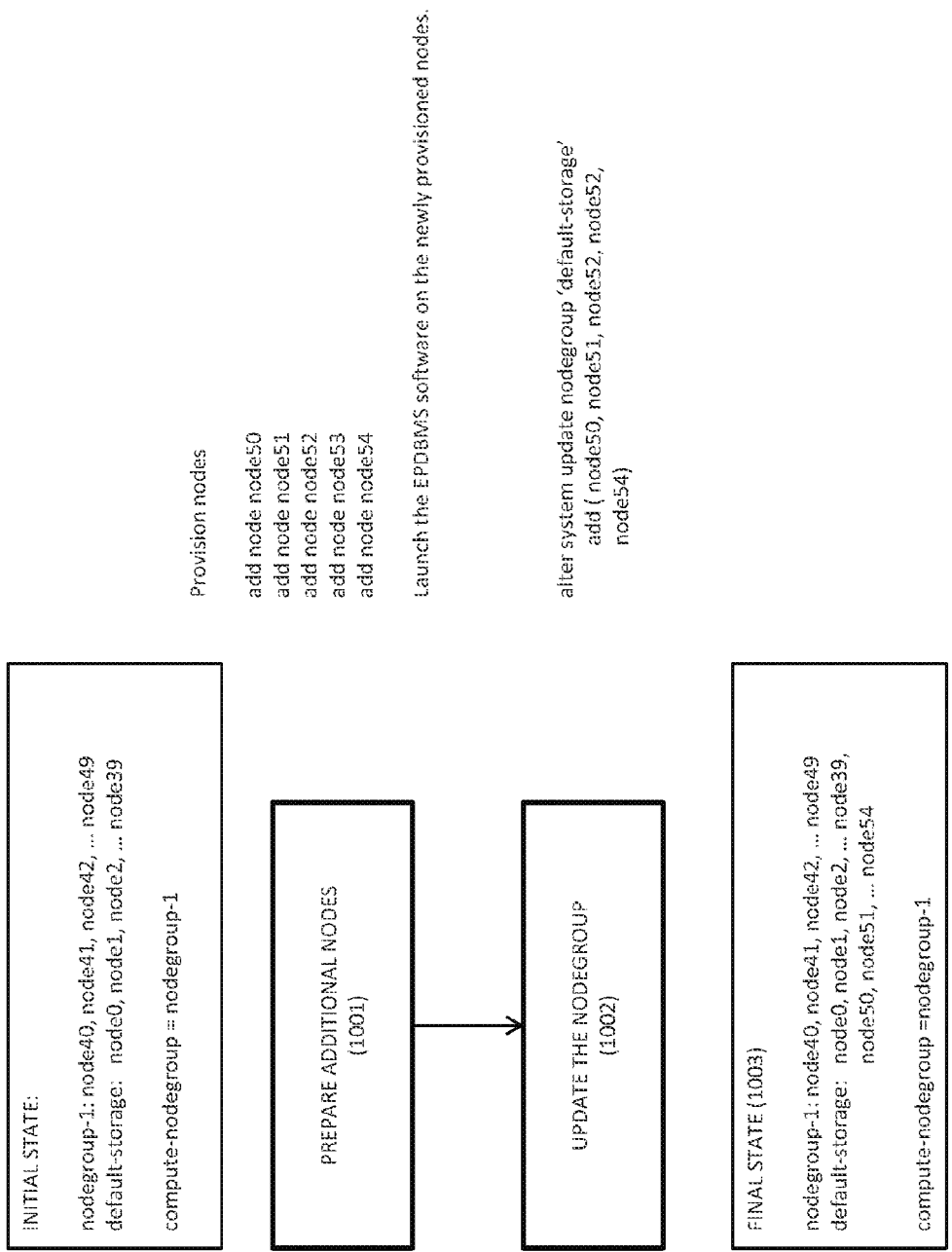
FIGURE 10. AN ILLUSTRATION OF THE STEPS INVOLVED IN DYNAMIC CAPACITY EXPANSION, ACCORDING TO ONE EMBODIMENT.

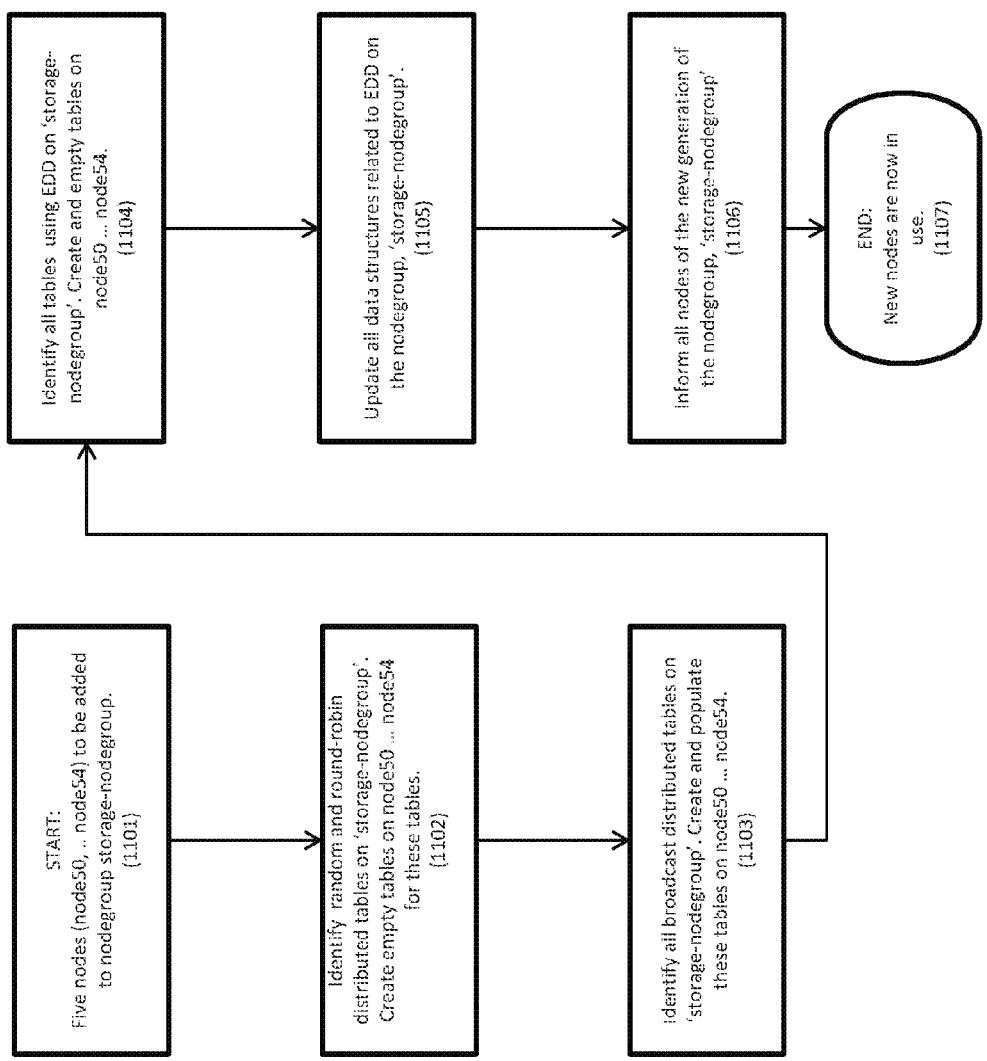
FIGURE 11. AN ILLUSTRATION OF THE STEPS PERFORMED DURING CAPACITY EXPANSION, ACCORDING TO ONE EMBODIMENT.

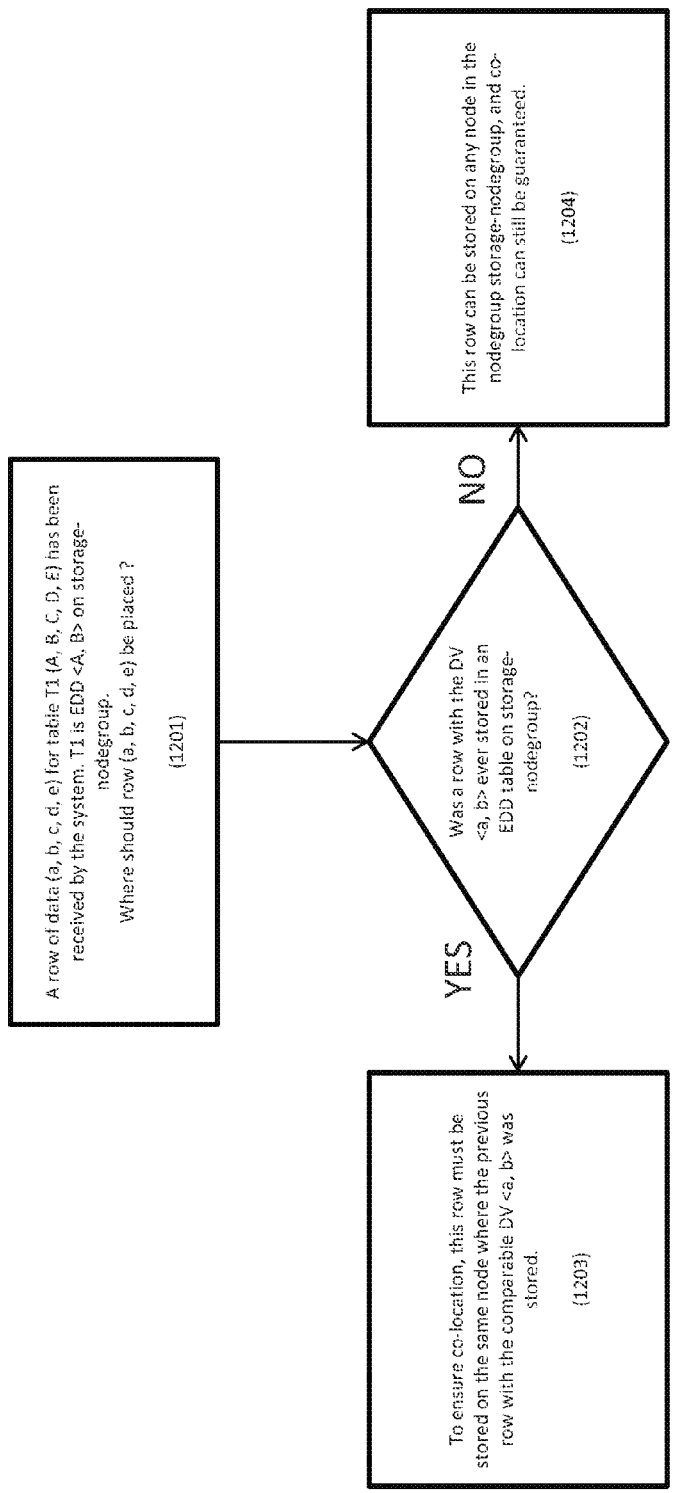
FIGURE 12. A HIGH LEVEL BLOCK DIAGRAM ILLUSTRATING WHERE TUPLES ARE STORED ON EDD TABLES TO ENSURE CO-LOCATION

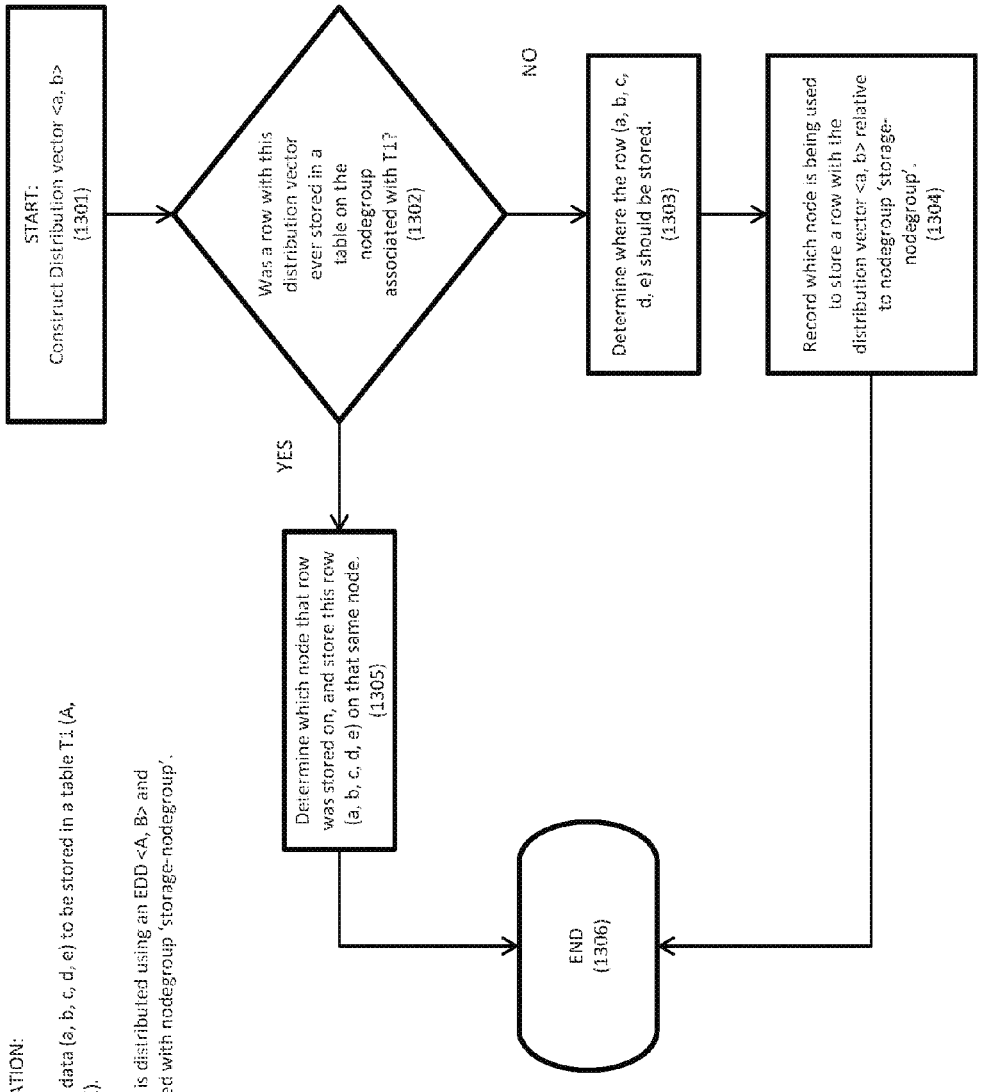

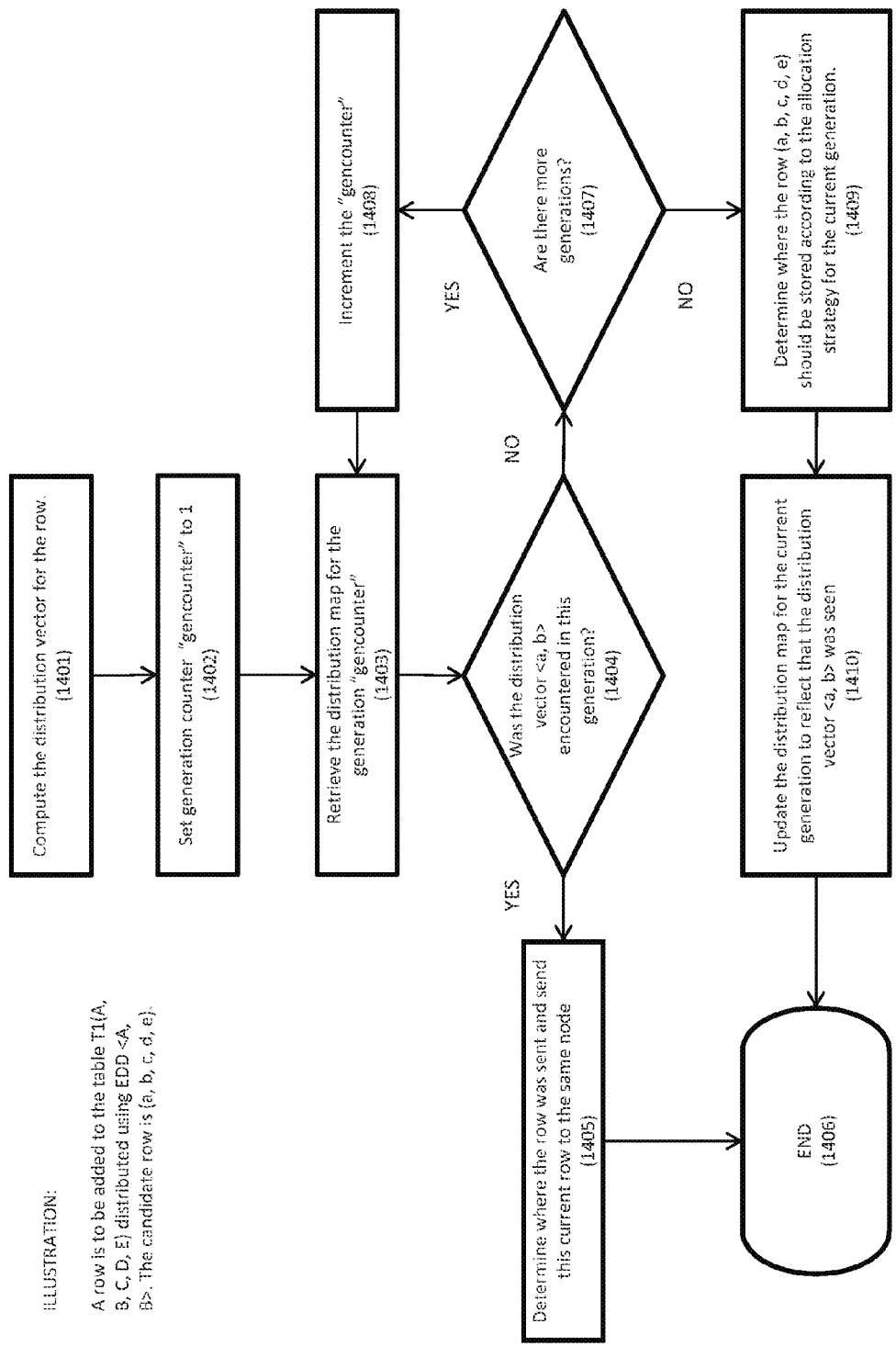
FIGURE 14. A DETAILED BLOCK DIAGRAM ILLUSTRATING WHERE TUPLES ARE STORED ON EDD TABLES TO ENSURE CO-LOCATION, ACCORDING TO ONE EMBODIMENT.

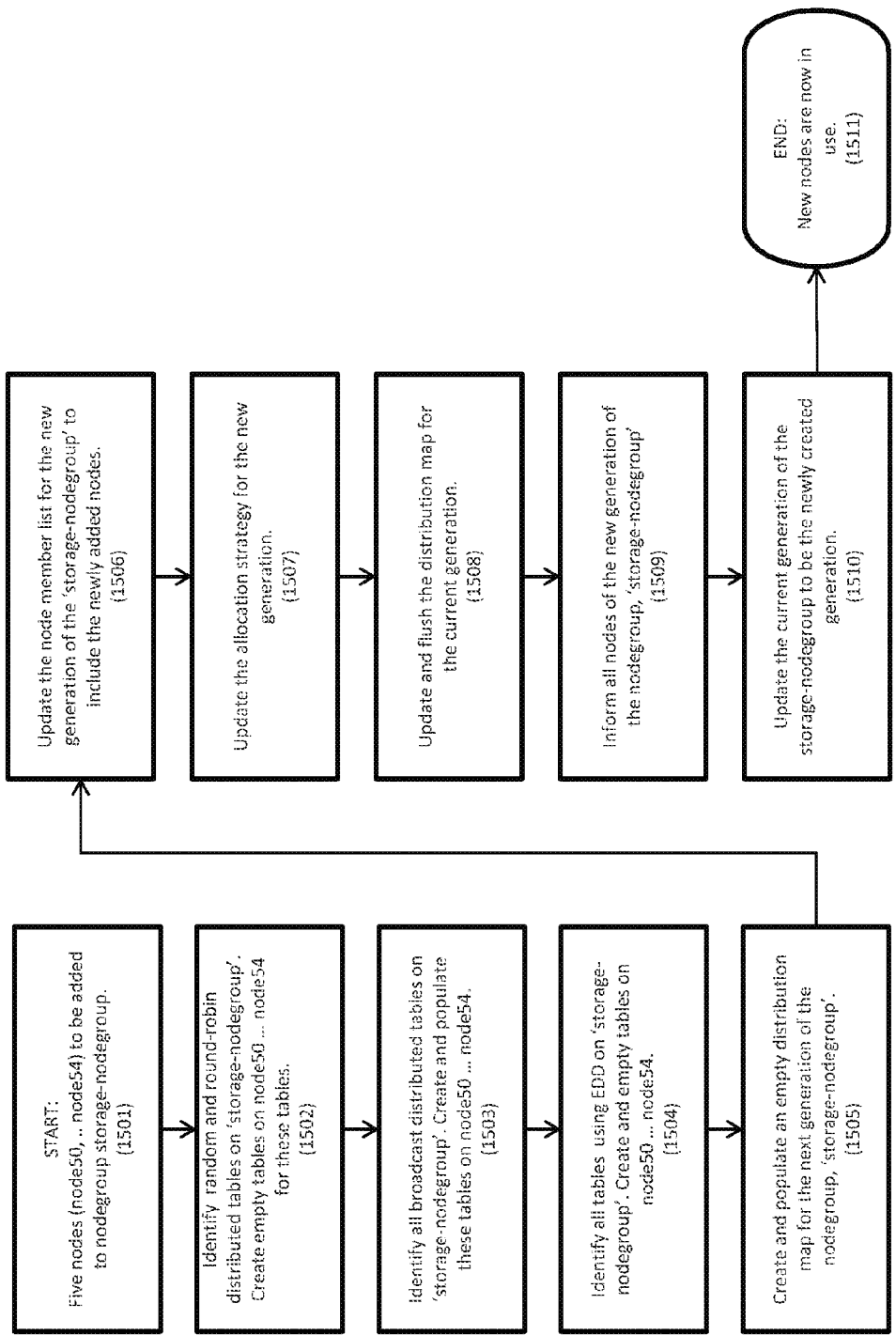
FIGURE 15. THE STEPS PERFORMED DURING CAPACITY EXPANSION, ACCORDING TO ONE EMBODIMENT.

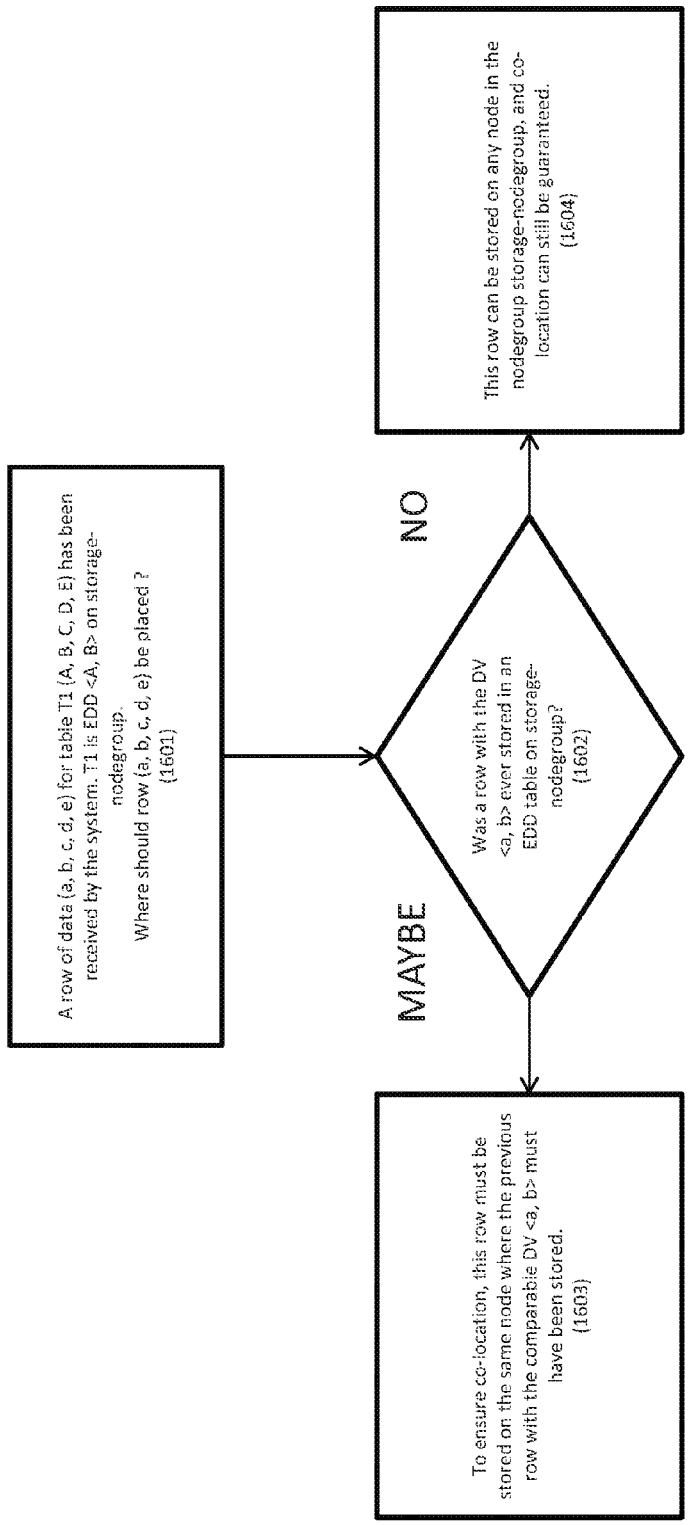
FIGURE 16. A HIGH LEVEL BLOCK DIAGRAM OF AN ASPECT OF THE LOGIC INVOLVED IN DECIDING WHERE TO PLACE A ROW OF DATA IN AN EDD TABLE, ACCORDING TO ONE EMBODIMENT.

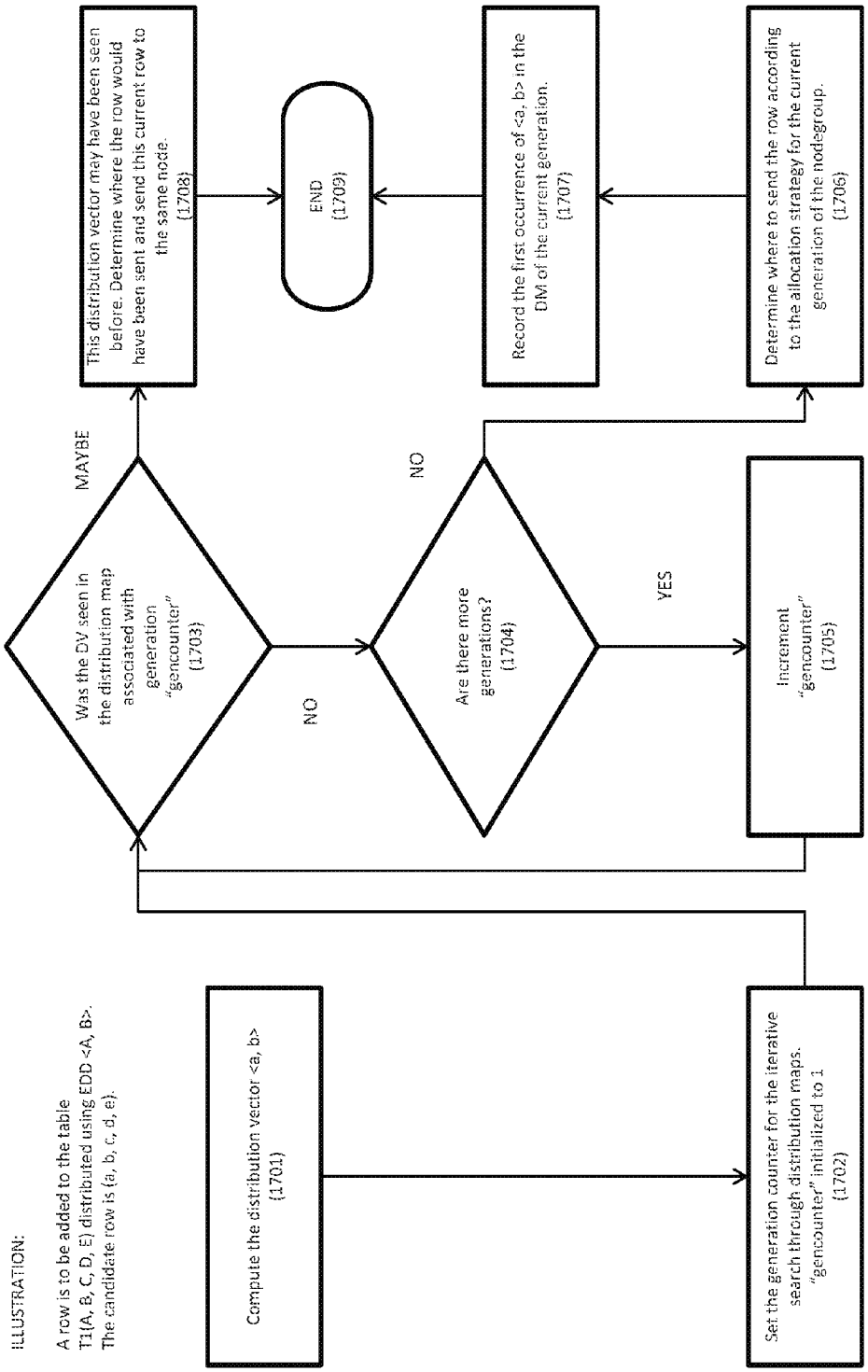
FIGURE 17. THE STEPS PERFORMED IN DETERMINING WHERE TO STORE A ROW OF DATA IN AN EDD TABLE, ACCORDING TO ONE EMBODIMENT.

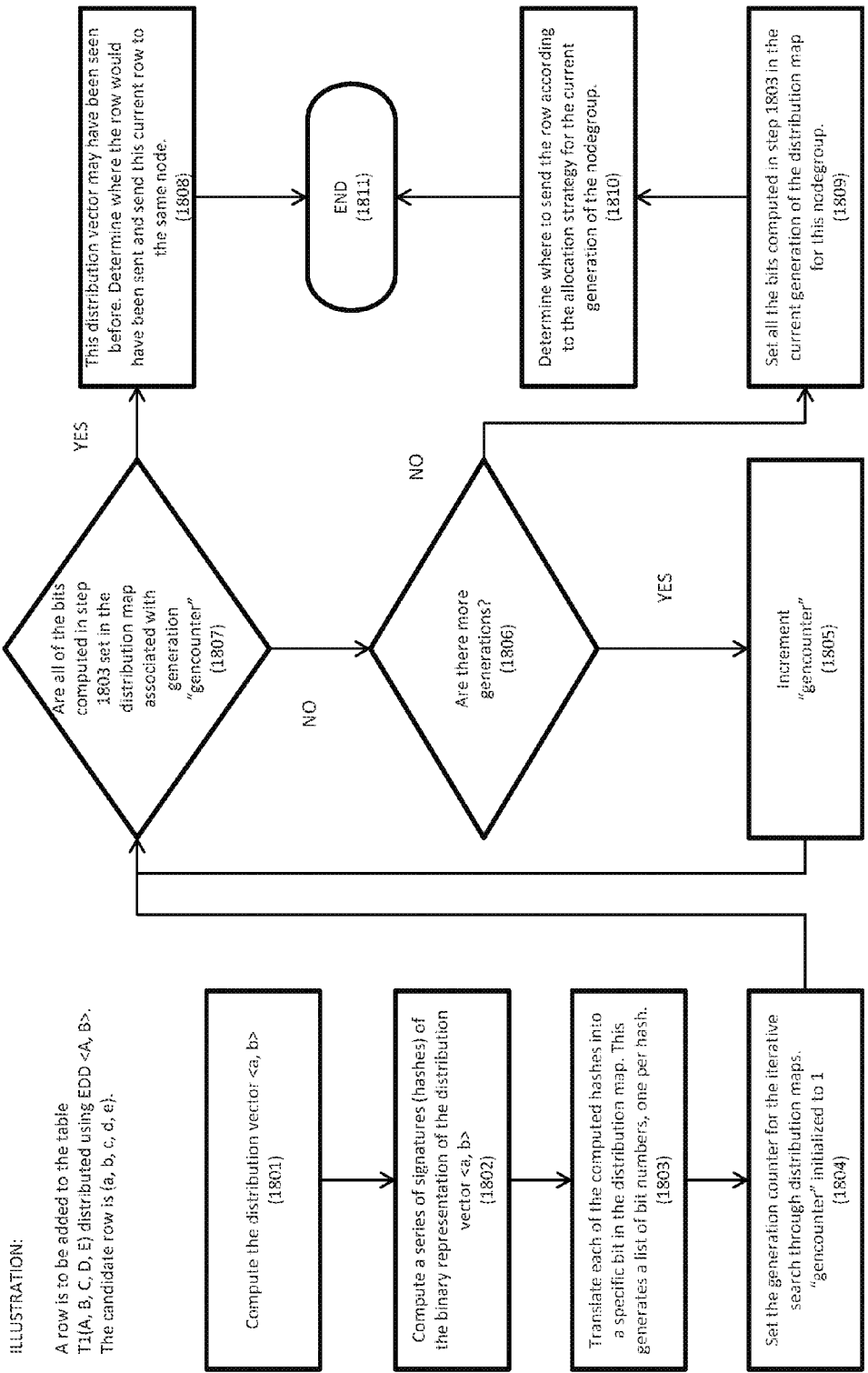
FIGURE 18. THE STEPS PERFORMED IN DETERMINING WHERE TO STORE A ROW OF DATA IN AN EDD TABLE, ACCORDING TO ONE EMBODIMENT.

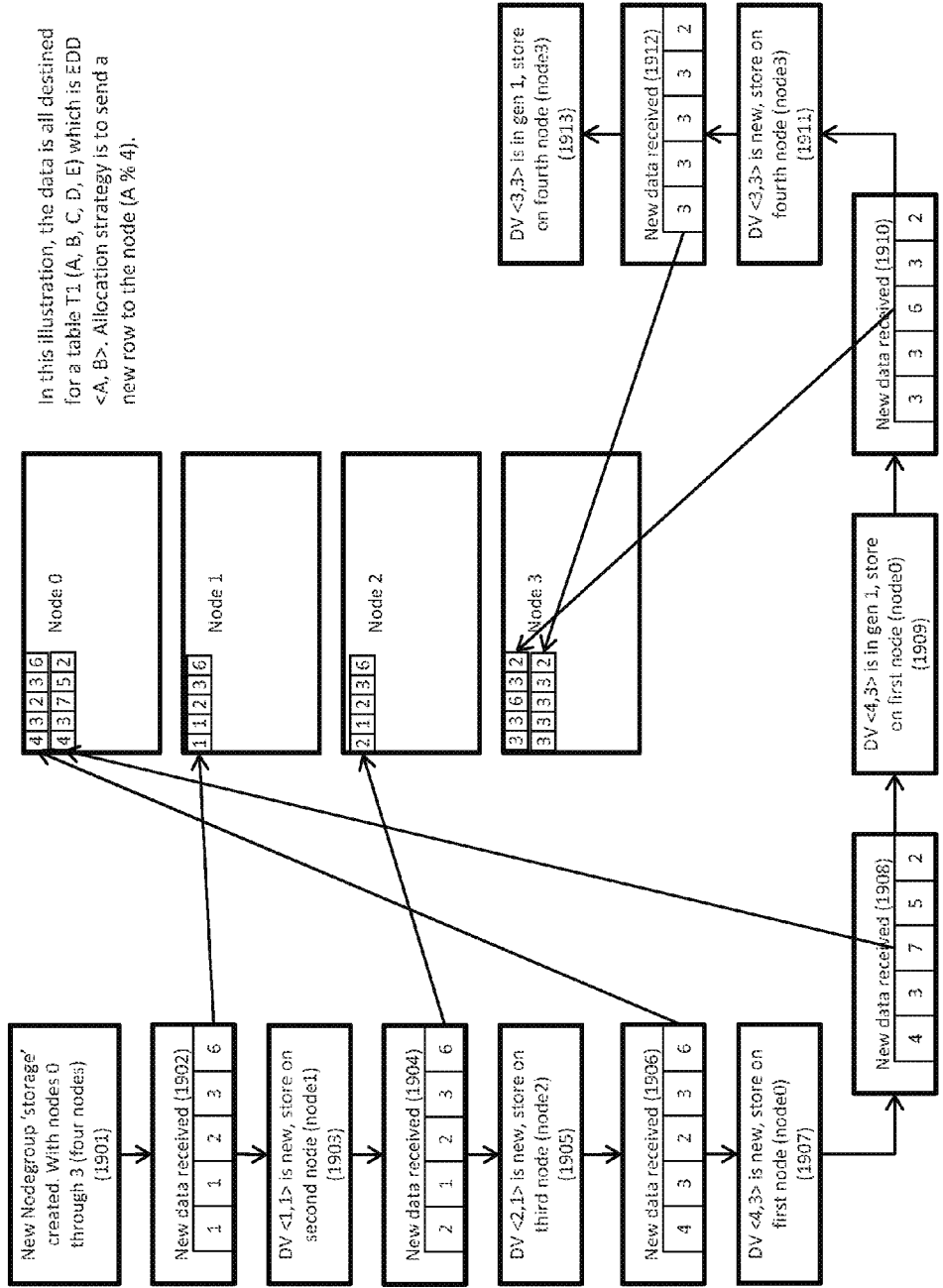
FIGURE 19: SHOWING THE PROCESS OF DISTRIBUTING THE FIRST SIX ROWS OF DATA ON A NEWLY CREATED NODEGROUP, 'STORAGE' WITH FOUR NODES INTO AN EDD TABLE, ACCORDING TO ONE EMBODIMENT.

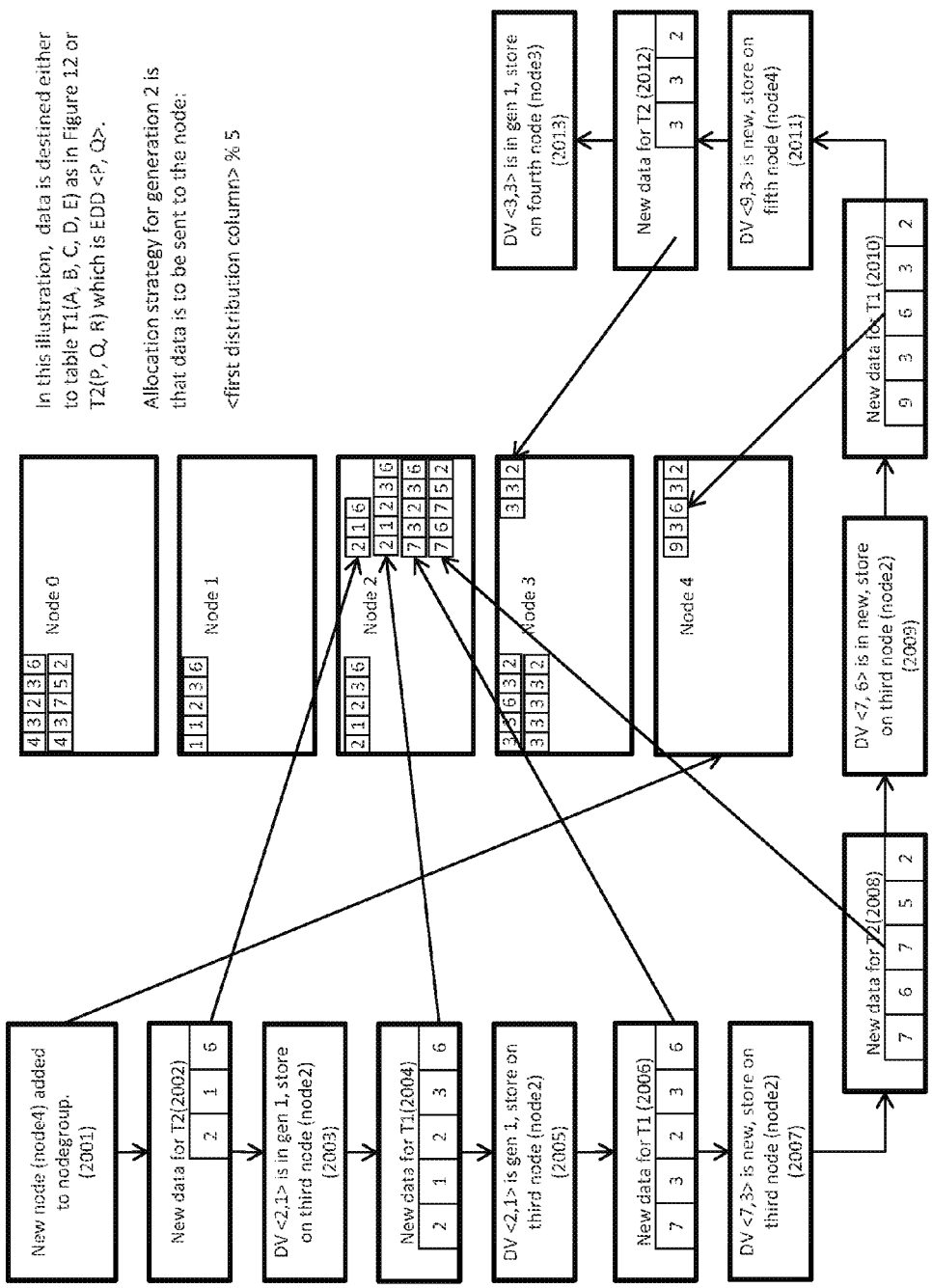
FIGURE 20: CONTINUES THE ILLUSTRATION FROM FIGURE 19 AND SHOWS THE ADDITION OF A NODE TO THE NODEGROUP AND THE PLACEMENT OF THE NEXT SIX ROWS OF DATA, ACCORDING TO ONE EMBODIMENT.

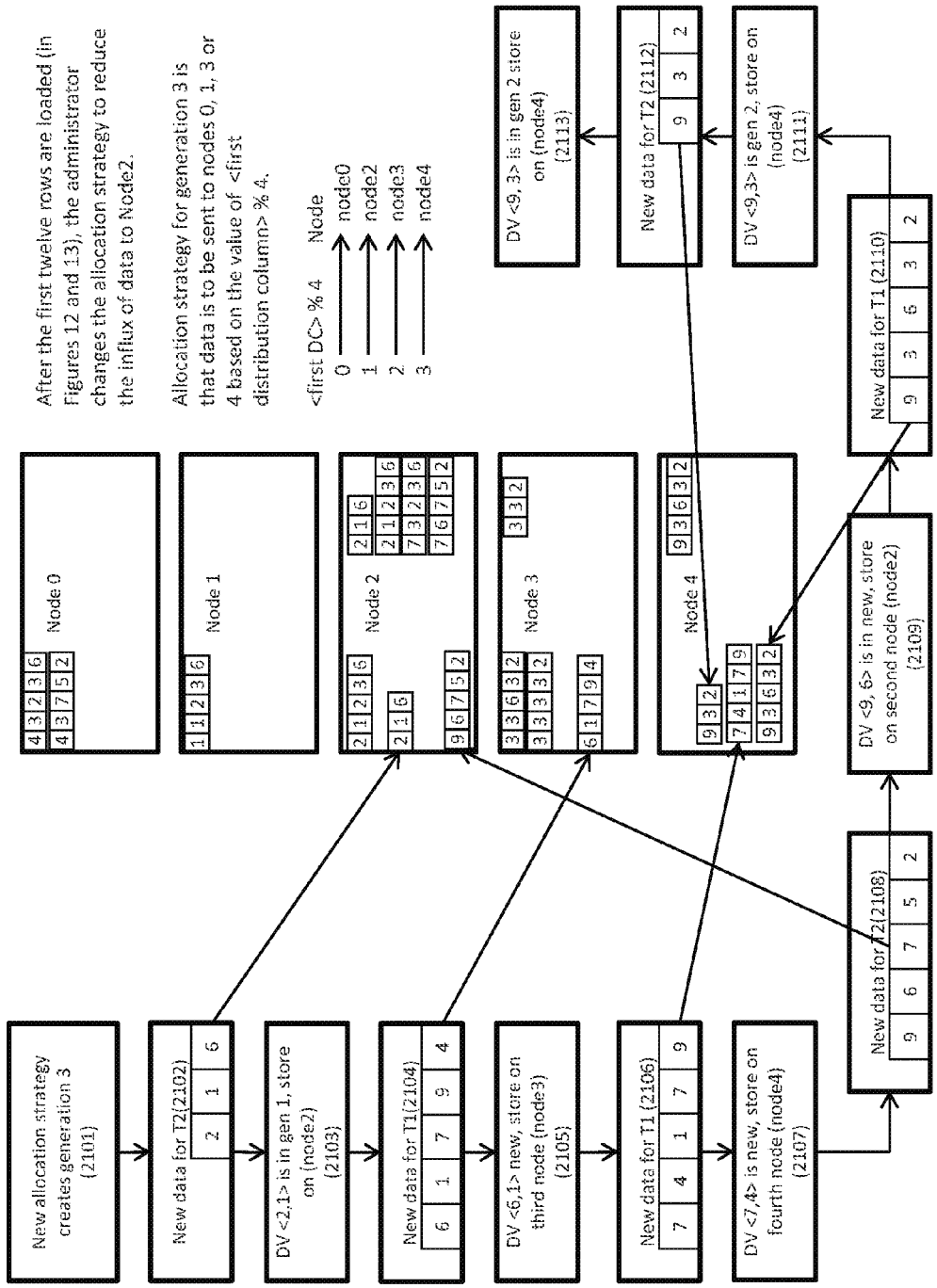
FIGURE 21: CONTINUES THE ILLUSTRATION FROM FIGURE 19 AND FIGURE 20 AND SHOWS THE PLACEMENT OF THE NEXT SIX ROWS OF DATA AFTER THE ADMINISTRATOR CHANGES THE ALLOCATION STRATEGY, ACCORDING TO ONE EMBODIMENT.

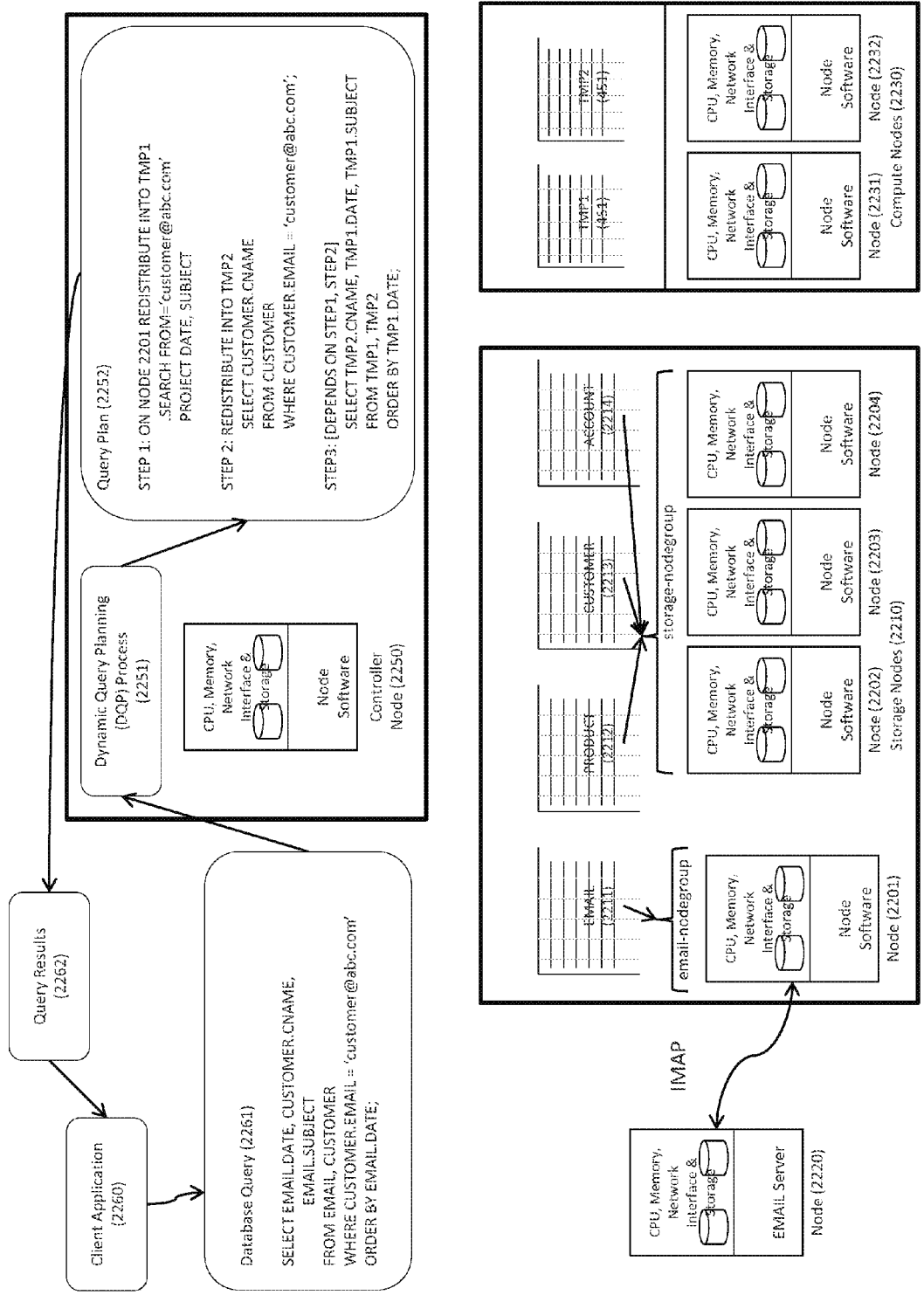
FIGURE 22: A HIGH LEVEL BLOCK DIAGRAM OF A PARALLEL ELASTIC DATABASE MANAGEMENT SYSTEM ILLUSTRATING HETEROGENEOUS PERSISTENT DATA STORES, ACCORDING TO ONE EMBODIMENT.

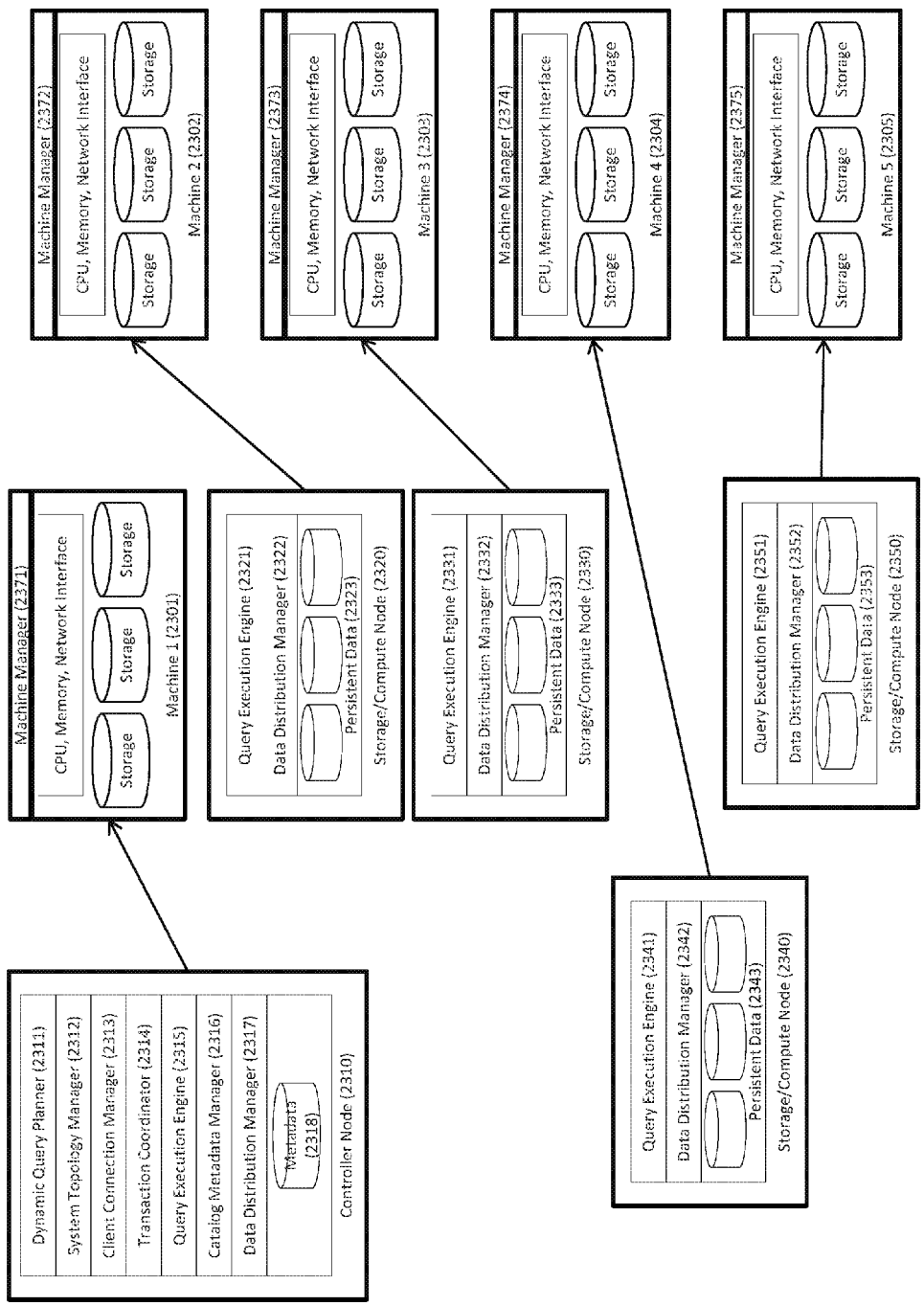
FIGURE 23: A HIGH LEVEL BLOCK DIAGRAM OF A PROCESS MODEL IN THE ELASTIC PARALLEL DATABASE MANAGEMENT SYSTEM SHOWING THE RELATIONSHIP BETWEEN MACHINES, NODES, AND SOFTWARE PROCESSES ACCORDING TO ONE EMBODIMENT.

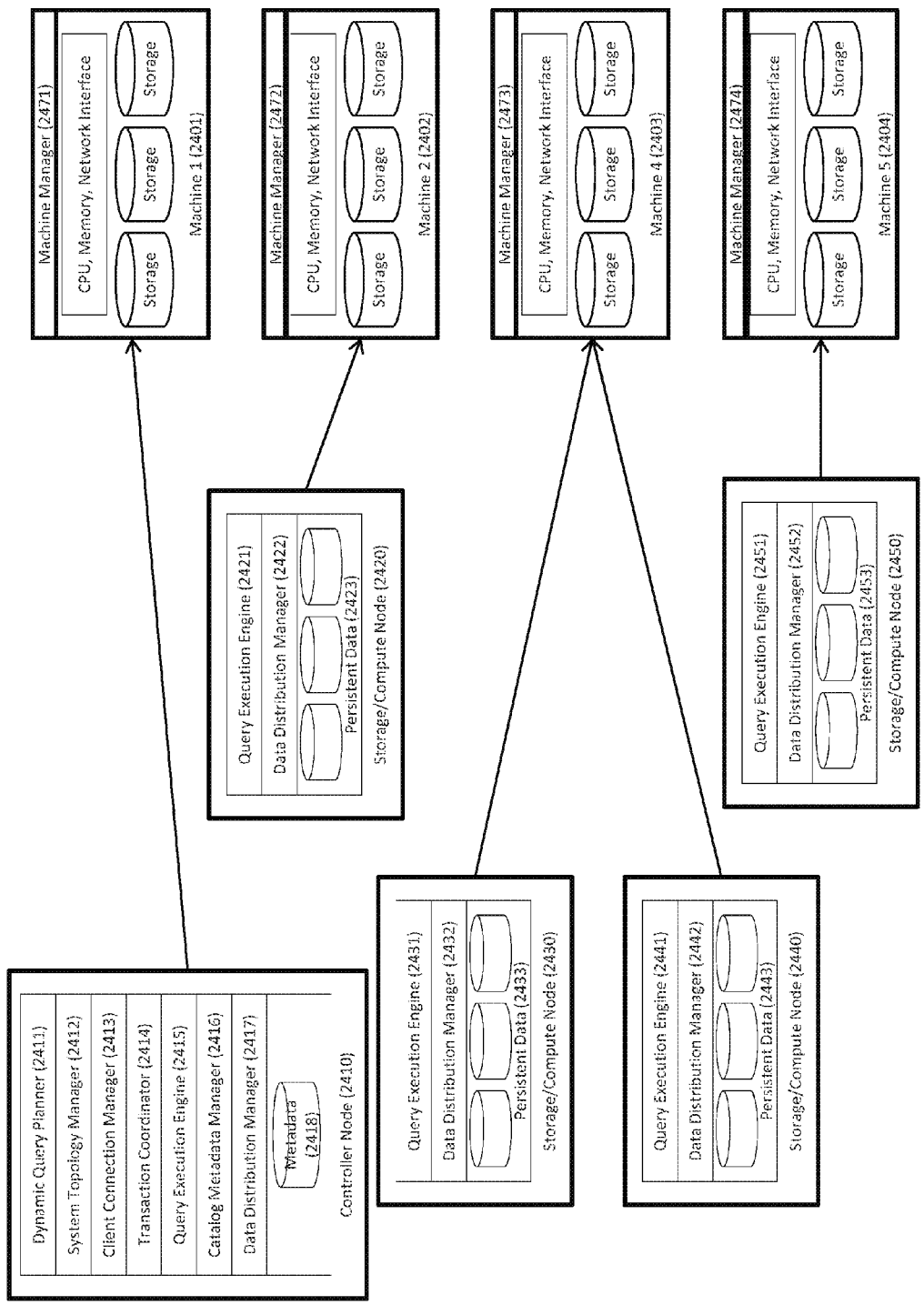
FIGURE 24: A HIGH LEVEL BLOCK DIAGRAM OF A PROCESS MODEL IN THE ELASTIC PARALLEL DATABASE MANAGEMENT SYSTEM SHOWING THE RELATIONSHIP BETWEEN MACHINES, NODES, AND SOFTWARE PROCESSES ACCORDING TO ONE EMBODIMENT.

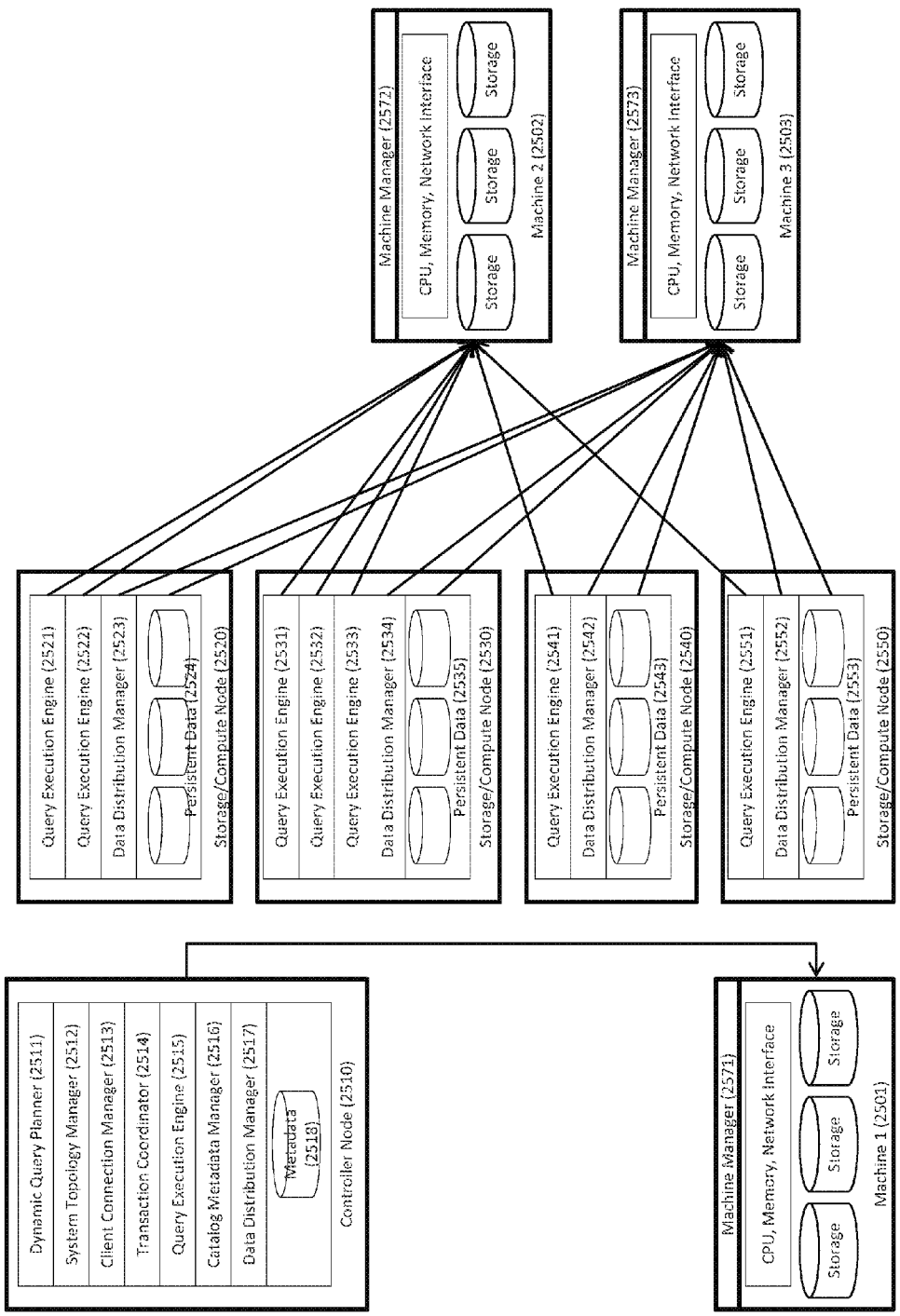
FIGURE 25. A HIGH LEVEL BLOCK DIAGRAM OF A PROCESS MODEL IN THE ELASTIC PARALLEL DATABASE MANAGEMENT SYSTEM SHOWING THE RELATIONSHIP BETWEEN MACHINES, NODES, AND SOFTWARE PROCESSES ACCORDING TO ONE EMBODIMENT.

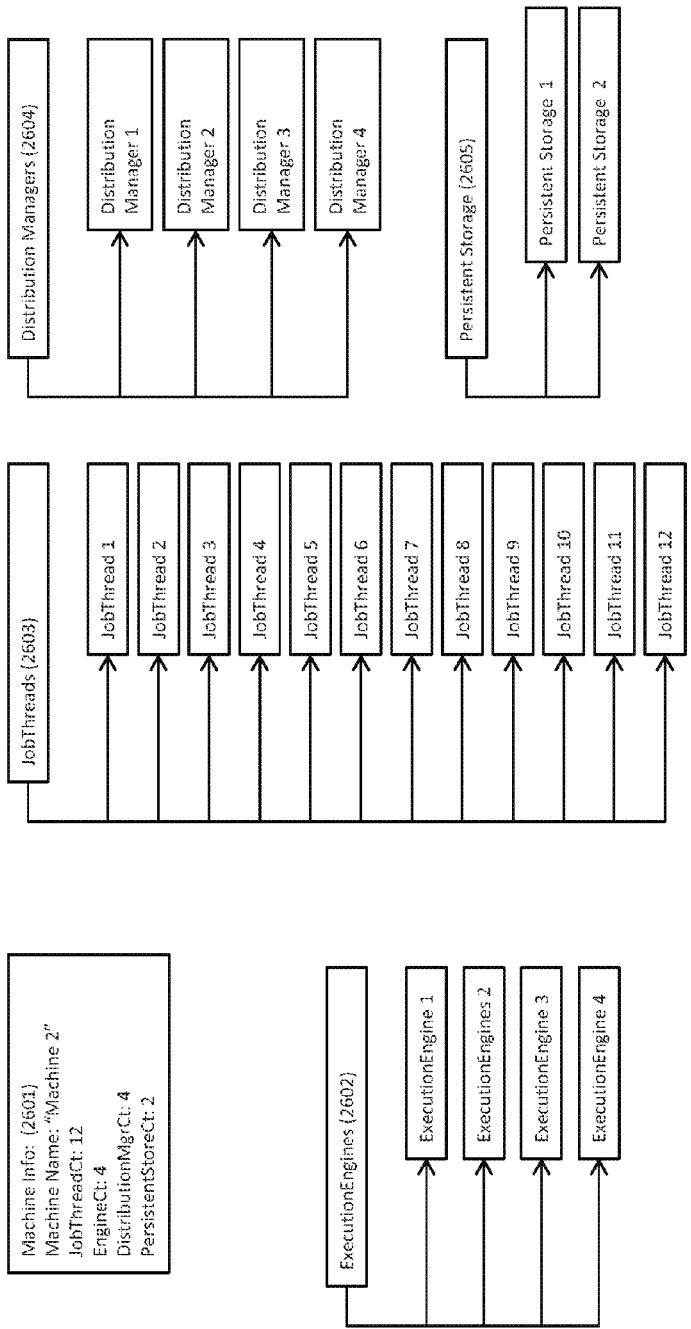
FIGURE 26: AN ILLUSTRATION OF SOME ASPECTS OF A MACHINE MANAGER ON A SINGLE MACHINE ACCORDING TO ONE EMBODIMENT.

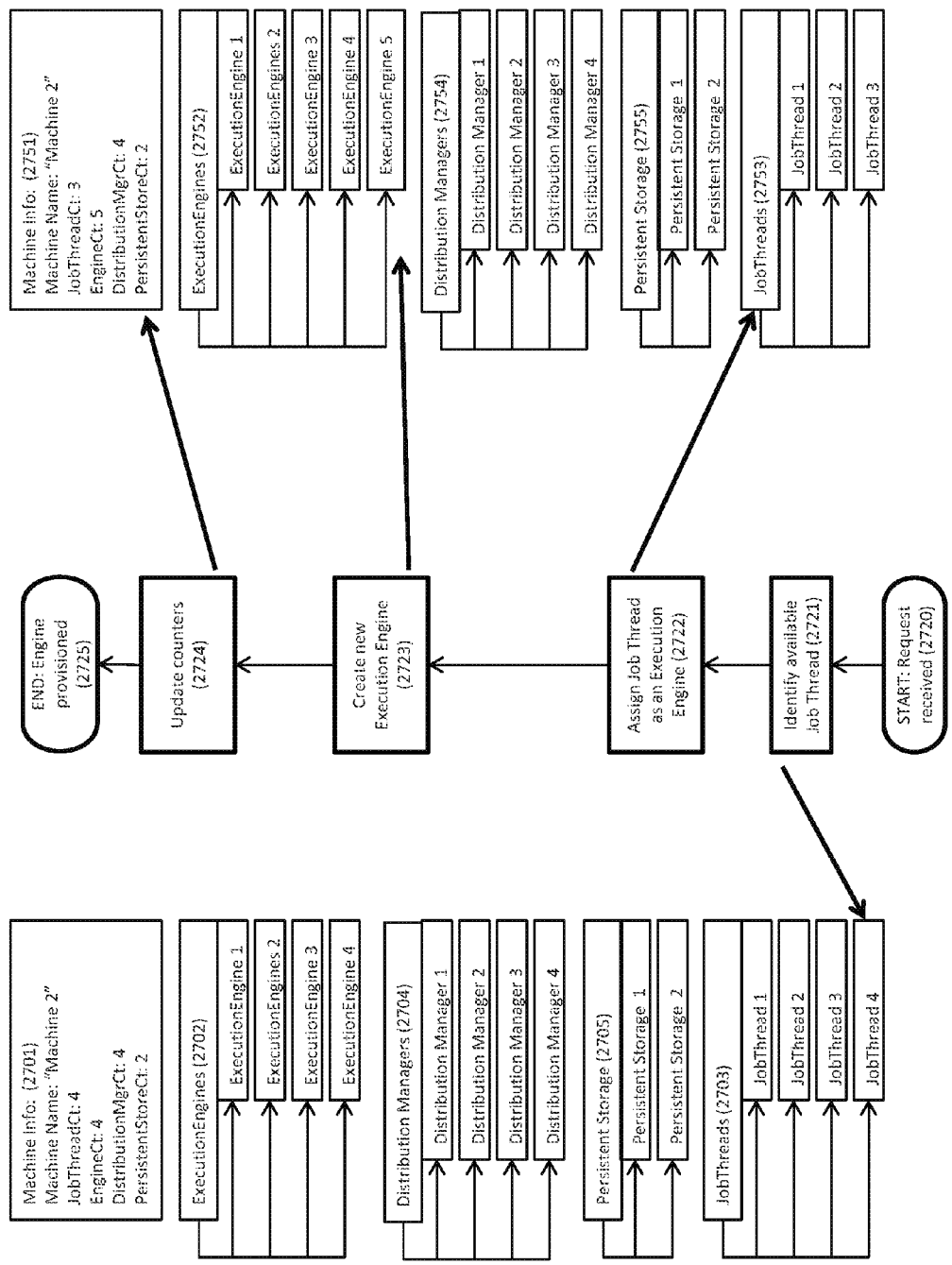
FIGURE 27: AN ILLUSTRATION OF THE STEPS INVOLVED IN LAUNCHING A NEW EXECUTION ENGINE ON A MACHINE ACCORDING TO ONE EMBODIMENT.

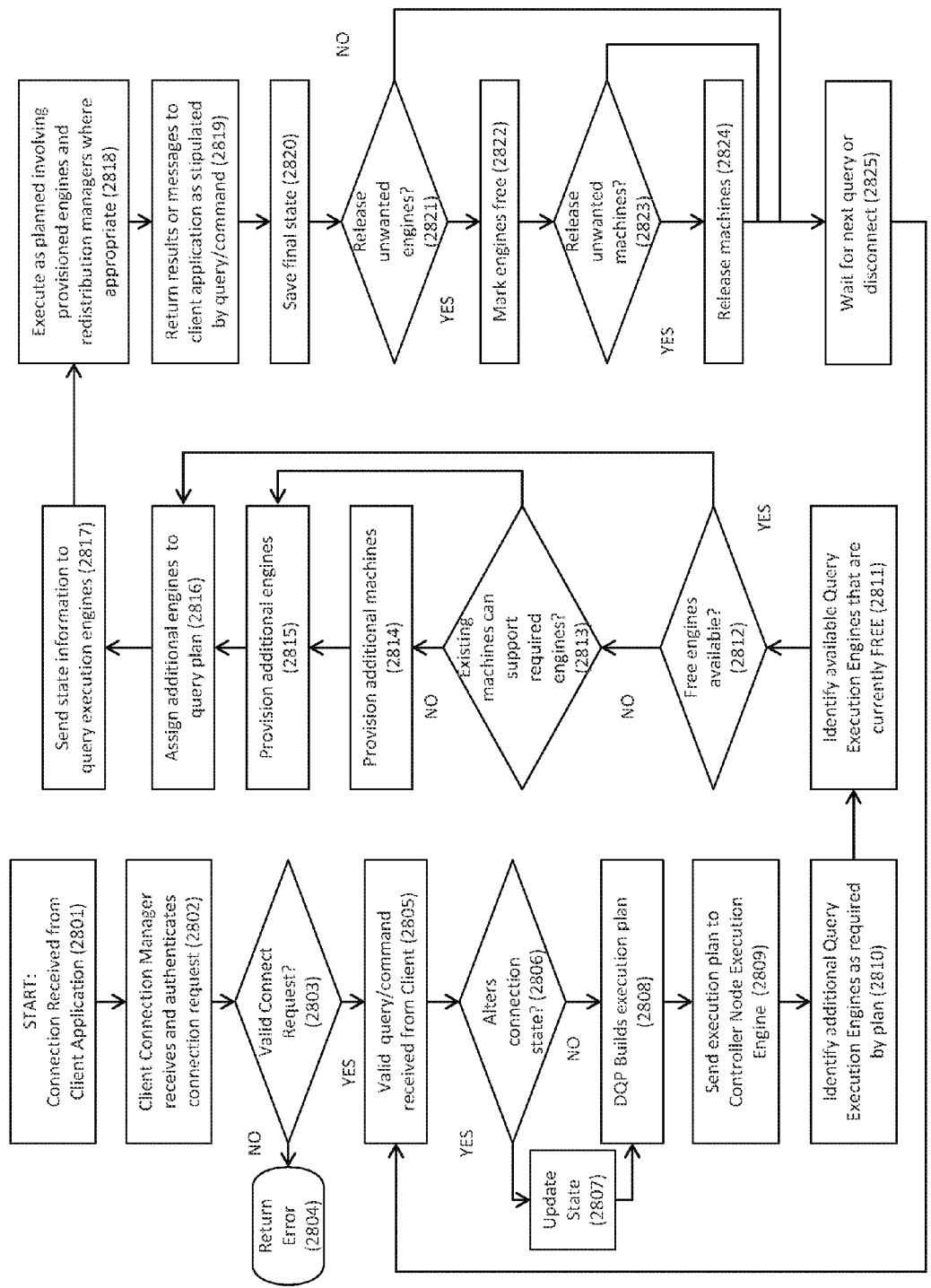
FIGURE 28: A HIGH LEVEL BLOCK DIAGRAM OF THE PROCESSING STEPS INVOLVED IN QUERY EXECUTION AS THEY RELATE TO THE PROCESS ARCHITECTURE ACCORDING TO ONE EMBODIMENT.

MECHANISM FOR CO-LOCATED DATA PLACEMENT IN A PARALLEL ELASTIC DATABASE MANAGEMENT SYSTEM

RELATED APPLICATION

This application is a continuation of U.S. application Ser. No. 13/253,222, filed Oct. 5, 2011 now abandoned which claims the benefit of U.S. Provisional Application No. 61/406,816, filed on Oct. 26, 2010. The entire teachings of the above application are incorporated herein by reference.

TECHNICAL FIELD

This patent application relates generally to data management systems. More specifically, it relates to a parallel shared-nothing relational database management system.

BACKGROUND

With the proliferation of technology, we face an exponential growth of information and data that must be stored, analyzed and acted upon by computers. It is generally believed that data volumes grow at a compounded annual growth rate (CAGR) of approximately sixty-percent. This growth results in a doubling of data volumes approximately every two years.

Computers and computer related infrastructures have evolved to keep pace with this exponential data growth. Over three decades now, it has been shown that large collections of inexpensive computers can be assembled, and their collective power can be brought to bear on large and complex problems.

These kinds of assemblages of computers are often based on the "Shared Nothing" (SN) architecture. In this architecture, a collection of individual computers (called a node), each containing CPUs, Disk Storage, Dynamic Memory, Network Interface Controller(s), and some software programs is first assembled. The CPU on each node, and any software programs that are run on that node have complete and direct access to all information that is on that node but have no direct access to any information that is resident on another node.

It has been demonstrated that SN architectures can be efficiently scaled up to hundreds, thousands and tens of thousands of nodes. For some kinds of data processing, these architectures can demonstrate linear or very close to linear scalability. In other words, if a system consisted of M identical nodes, and another system consisted of N identical nodes, and M>N, the system with M nodes could perform (M/N) times more work in a given interval of time compared to the system with N nodes. In some cases this means that the system with M nodes could complete a piece of work M/N times faster than the system with N nodes.

SN database systems, called "Parallel Database Management Systems" (PDBMS) achieve their scalability and performance by having a large number of nodes each perform a part of the processing, on a subset of the problem, in parallel, and at the same time.

In such systems, tuples of each relation in the database are partitioned (declustered) across disk storage units attached directly to each node. Partitioning allows multiple processors to scan large relations in parallel without needing any exotic I/O devices. Such architectures were pioneered by Teradata in the late seventies, by Netezza in the 2000's, and by several research projects.

SN architectures minimize interference by minimizing resource sharing and contention. They also exploit commodity processors and memory without needing an incredibly powerful interconnection network.

SUMMARY

In pertinent aspects, a database management apparatus executes queries in a way that provides parallelism and elasticity through the concept of storage, compute, and control "nodes". Nodes are an abstraction consisting of a collection of software programs that execute on one or more virtual or physical machines. The nodes may provide functions such as Query Execution Engines, a Data Distribution Manager, and a Persistent Data Store. The Query Execution Engines receive queries and determine a plan to execute them. The Data Distribution Manager determines how and where to store data needed by the queries. The Persistent Data Stores are software programs that store and retrieve data, and provide some interface through which the data can be accessed.

Elasticity is provided by allowing the number and composition of the nodes, and machines in the system to be changed while queries are being executed. Parallelism is provided by allowing a query to be executed such that more than one activity related to the execution may occur at the same time, and by having more than one node execute parts of the query at the same time.

Nodes are arranged in functional groups called nodegroups. A nodegroup is a non-empty, ordered list of nodes. Nodegroups consist of nodes of the same type. Storage nodes make up storage nodegroups, compute nodes make up compute nodegroups, and control nodes make up control nodegroups.

Tables in the system are associated with storage nodegroups or compute nodegroups. Each table is associated with one nodegroup. Zero or more tables may be associated with a storage or compute nodegroup. Each system preferably has a default-compute-nodegroup and a default-storage-nodegroup. The default nodegroup isn't necessarily a fixed nodegroup, and the system may assign the default nodegroups and/or assist the user to do so when none is specified.

Each client process accessing the system may do so through multiple connections.

Data in the tables is stored on one or more of the nodes associated with the table's nodegroup. Data are distributed based on Distribution Methods which may be either data dependent or data independent.

The available compute capacity in the system is changed through Elastic Compute Capacity (ECC) by either (a) changing the compute-nodegroup associated with a connection, or (b) adding or removing nodes from the compute-nodegroup associated with a connection.

The available storage capacity on a storage nodegroup can be dynamically changed by adding node to or removing nodes from the nodegroup.

The system also provides a mechanism by which multiple potentially heterogeneous databases can be presented and queried as if they were one database. One example of a persistent data store is a relational database. Other examples include flat files, non-relational databases, etc.

Each row of data in a table distributed according to a data dependent distribution method has a Distribution Vector, which is a set of attributes of the table (distribution columns) that determine where each row must be stored.

Two DV's are considered to be comparable if the number of distribution columns in both DV's is the same and the corresponding distribution column in both distribution vectors share a canonical representation and the size of a binary representation of both the DVs is the same. Two DV's are identical if they are comparable and their binary representations are identical.

If two rows (be they from the same table or different tables) have identical DV's, and the tables are associated with the same nodegroup, and the tables are distributed according to a data dependent distribution method, the rows must be stored on the same node. This is called co-location.

If tables are distributed according to elastic data distribution (EDD) methods, co-location is still guaranteed when nodes are added to the nodegroup without redistributing data.

When a row is received and is associated with a table that is distributed according to a data dependent distribution method, the distribution manager determines on which node to store the row.

If a table is distributed according to an elastic data distribution (EDD), the data distribution manager stores a new row of data in a manner that would ensure co-location. It does this by determining whether this is the first occurrence of the DV, and if it is the row is stored on some node in the nodegroup, and if the DV has been seen before it is stored on the same node that was used to store the DV before.

One of the ways to implement this is to associate a Distribution Map (DM) with each nodegroup, where the DM is a data structure tracking all DV's ever seen for a table in that nodegroup, and the location where that row was stored.

Rather than store all possible DV's and the location where the rows were stored (which would be prohibitively expensive to do), the system uses a process for row placement in an EDD as per following. The DV is first computed and:

If it can be said with absolute certainty that this DV has never been seen before, the row is placed in some deterministic place (determined by an Allocation Strategy), but If it cannot be determined with absolute certainty that this DV was never seen before, it is place in a location where it would have been placed on the first time that it would have been encountered.

One of the ways to achieve this is to associate with each nodegroup a collection of "generations". Each nodegroup, when initially created, has a first generation. A generation consists of, among other things, a generation number, a Distribution Map, and an Allocation Strategy.

The Allocation Strategy is a deterministic algorithm that determines where to send a row of data, and must be executable on just the information contained in the DV of the row, and any information in that generation. The latest generation (last) is called the current generation.

The Distribution Map is a set of data structures that are used to keep track of DV's that have been seen. More precisely, they are used to determine which DV's have not been seen for the first time when the associated generation was the current generation.

When Dynamic Capacity Expansion (DCE) is used to make changes to a nodegroup's membership, or Allocation Strategy, a new generation is created.

If a table is distributed according to an Elastic Data Distribution, the data distribution manager stores a new row of data in a manner that would ensure co-location. It can do this by doing an iterative search through all generations to find the first generation where it cannot be determined for sure that a DV was not seen.

Either such a generation can be found, or no such generation can be found. In the former case, the row is dispatched according to the allocation strategy in that generation, and co-location can is guaranteed. In the latter case, it can be inferred that the DV was never seen before and therefore it will be dispatched according to the allocation strategy in the current generation, and the DM in the current generation will be updated to reflect the occurrence of the DV, and co-location is again guaranteed.

When a row is encountered with a DV that has never been seen before, some indications are made in the DM of the current generation indicating that that the DV was seen. Each DV creates a unique indication but multiple different DV's may create the same identification.

As a result, from an inspection of the DM, it cannot always be said for sure whether a particular DV was seen for the first time in that generation. On the other hand, it can be said for certain whether a DV was not seen for the first time in that generation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a high level block diagram of the Elastic Parallel Database Management System (EPDBMS) and database client application software according to one embodiment.

FIG. 2 is a high level block diagram of a Parallel Elastic database management system according to one embodiment.

FIG. 3 is a block diagram depicting the high level program flow during query execution according to one embodiment.

FIG. 4 is a high level block diagram depicting various components and elements that are part of query execution according to one embodiment.

FIG. 5 is a high level block diagram depicting various logical groupings of nodes in a system according to one embodiment.

FIG. 6 is a detailed block diagram of the dynamic query planning process according to one embodiment.

FIG. 7 is a schema to illustrate the query planning process according to one embodiment.

FIG. 8 is an illustration of the steps involved in adding compute capacity to the system according to one embodiment.

FIG. 9 is an illustration of the steps involved in reducing compute capacity to the system according to one embodiment.

FIG. 10 is an illustration of the steps involved in dynamic capacity expansion according to one embodiment.

FIG. 11 illustrates the steps performed during capacity expansion according one embodiment.

FIG. 12 is a high level block diagram illustrating where tuples are stored on EDD tables to ensure co-location.

FIG. 13 is another high level block diagram illustrating where tuples are stored on EDD tables to ensure co-location.

FIG. 14 is a detailed block diagram illustrating where tuples are stored on EDD tables to ensure co-location according to one embodiment.

FIG. 15 illustrates the steps performed during capacity expansion according to one embodiment.

FIG. 16 illustrates the steps performed in determining where to store a new row in an EDD table according to one embodiment.

FIG. 17 illustrates the steps performed in determining where to store a new row in an EDD table according to one embodiment.

FIG. 18 illustrates the steps performed in determining where to store a new row in an EDD table according to one embodiment.

FIG. 19 illustrates the process of distributing the first six rows of data on a newly created nodegroup, 'storage' with four nodes into an EDD table according to one embodiment.

FIG. 20 continues the illustration from FIG. 19 and shows the addition of a node to the nodegroup and the placement of the next six rows of data according to one embodiment.

FIG. 21 continues the illustration from FIG. 19 and FIG. 20 and shows the placement of the next six rows of data after the administrator changes the allocation strategy according to one embodiment.

FIG. 22 is a high level block diagram of a parallel elastic database management system illustrating heterogeneous persistent data stores according to one embodiment.

FIG. 23 is a high level block diagram of a process model in the elastic parallel database management system showing the relationship between machines, nodes, and software processes according to one embodiment.

FIG. 24 is a high level block diagram of a process model in the elastic parallel database management system showing the relationship between machines, nodes, and software processes according to one embodiment.

FIG. 25 is a high level block diagram of a process model in the elastic parallel database management system showing the relationship between machines, nodes, and software processes according to one embodiment.

FIG. 26 is an illustration of some aspects of a machine manager on a single machine according to one embodiment.

FIG. 27 is an illustration of the steps involved in launching a new execution engine on a machine according to one embodiment.

FIG. 28 is a high level block diagram of the processing steps involved in query execution as they relate to the process architecture according to one embodiment.

DETAILED DESCRIPTION OF THE INVENTION

A description of example embodiments of the invention follows.

Methods and apparatus to build an Elastic Parallel Database Management System (EPDBMS) are described.

Preferred embodiments of an Elastic Parallel Database Management System (EPDBMS) are described here.

FIG. 1 provides a high level block diagram of an EPDBMS. A database client application (101) submits queries (102) to the EPDBMS (103) in some language. The industry standard Structured Query Language, or a variant thereof, may be used for this purpose. The EPDBMS processes the query and returns the results (104) of the query to the client application program.

Data in the system are distributed across a plurality of nodes within the system. The EPDBMS consists of an assemblage of nodes. FIG. 2 provides a high level block diagram of an EPDBMS. The Client Application Software (230) communicates with a Controller Node (201) that is part of the EPDBMS. The Controller Node includes various components of the EPDBMS such as a Dynamic Query Planner (202), a System Topology Manager (203), a Client Connection Manager (204), a Transaction Coordinator (205), a Catalog Metadata manager (206), a Data Distribution Manager (207) and a persistent Metadata repository (208). The Controller Node communicates with a number of Database Nodes (250, 260, 270, 280 and 290), each of which consist of one or more Query Execution Engines (251, 261, 271, 281 and 291), and a Data Distribution Manager (252, 262, 272, 282 and 292). Each node is also associated with a persistent data store where the database data resides.

In various embodiments, the persistent data store may be:
- a relational database management system (RDBMS)
- not a relational database management system but instead some other non-relational system
- the same database management system on all nodes
- different database management systems on different nodes When a connection is initiated by the Client Application Software (230) to the EPDBMS, the Client Connection Manager (204) verifies authentication credentials and determines whether to accept the connection or not. Subsequently if there is a communication failure between the EPDBMS and the Client Application Software, it is the responsibility of the Client Connection Manager to notify all other relevant components within the EPDBMS and handle the connection failure. A specific case of such processing is the handling of a disconnection while a database transaction is in progress. The Client Connection Manager (204) communicates the disconnection information to the Transaction Coordinator (205) which handles the interruption to the transaction and ensures data consistency. The operation of the Dynamic Query Planner (202) is described in detail in the section on Dynamic Query Planning later.

FIG. 3 is a high level block diagram depicting the query execution process in EPDBMS. When a query is presented to the system (301), it is first analyzed to determine syntactical validity (302) and a failure results in a suitable message being delivered to the user (310). If the syntax and grammar are valid, a parallel query plan is constructed and executed (303). The execution of the parallel query plan will result in either results or a suitable message being returned to the user, depending on the nature of the query being executed (304), which ends the process (305).

Nodes and Nodegroups

The EPDBMS consists of a plurality of nodes. Nodes in the system consist of a logical assemblage of some computing resources (CPU, Network, Memory, and Storage), and some associated software components.

Nodes in the system are of four types:
- Controller Node
- Storage Node
- Compute Node
- Un-enrolled Nodes Storage and compute nodes in the system are grouped into "nodegroups". A nodegroup is a non-empty collection of nodes. Each storage or compute node in the system may be a member of none, one, or more nodegroups. A node that is a member of no nodegroups is an un-enrolled node. A node that is a member of a nodegroup is an enrolled node. The EPDBMS maintains a group counter associated with each node, and the group counter is incremented whenever a node is added to a nodegroup. Therefore, an un-enrolled node has a group counter value of zero, and enrolled nodes have a non-zero group counter value. The group counter on a node is decremented when the node is removed from a nodegroup.

Each EPDBMS shall contain at least one nodegroup which will be used for all intermediate computational purposes during query execution. This nodegroup is referred to as the default-compute-nodegroup. When a query begins execution, the system determines where intermediate tables generated during the execution of the query are to be placed. By default, this is the default-compute-nodegroup but the administrator may specify an alternate location. The location to be used to store these intermediate tables is called the compute-nodegroup for that connection.

In one embodiment, an inventory of Nodes and Nodegroups in the system is stored in a System Topology Manager (203).

FIG. 4 further illustrates the roles of the various nodes in the system during the execution of an query. A query (402) is received from a Client Application (401). It is received on the Controller Node (470) and the Dynamic Query Planning (DQP) process (403) results in a query plan (404). The query plan when executed utilizing the Storage and Compute Nodes results in Query Results (405) that are returned to the client application (401). As depicted in this figure, this system consists of seven nodes, five of which are Storage Nodes (410) and two of which are Compute Nodes (450). As illustrated, the tables (411, 412, 413, 414) are stored on the Storage Nodes (421, 422, 423, 424 and 425), and the intermediate results TMP1 (451) generated during the query plan execution is stored on the Compute Nodes (461, 462).

Creation and Destruction of Tables in the EPDBMS

Each table in the system has one associated nodegroup. Many tables may be associated with a single nodegroup, but each table is only associated with a one nodegroup.

An association between a table and its nodegroup is established at the time when the table is created. Data for a table is stored on the nodes that are members of the associated nodegroup in accordance with the Allocation Strategy for the nodegroup, and the Distribution Method associated with the table.

FIG. 5 further illustrates this by depicting the storage nodegroups (571, 572), that each consists of three storage nodes. "Storage Nodegroup 1" consists of the storage nodes 521, 522 and 523, and "Storage Nodegroup 2" consists of the storage nodes 523, 524 and 525. The "Compute Nodegroup 1" (573) consists of two nodes (561, 562). The tables PRODUCT and RATES (511, 513) are associated with the "Storage Nodegroup 1" (571) and the tables CUSTOMER and ACCOUNT (512, 514) are associated with "Storage Nodegroup 2" (572).

Each nodegroup has an associated counter called the tablecount. The value of tablecount is the number of tables that are associated with the nodegroup. When a user creates a table and associates that table with a nodegroup, the tablecount associated with the nodegroup is incremented. The tablecount on a nodegroup is decremented when a table on the nodegroup is disassociated from the nodegroup.

In one embodiment, the SQL/DDL (Data Definition Language) command issued to create a table shall include an explicit specification of the nodegroup with which to associate the table.

In one embodiment, each EPDBMS shall contain a nodegroup referred to as the default-storage nodegroup, and if the DDL to create the table does not explicitly specify a nodegroup with which to associate the table, the default-storage nodegroup is used.

Data Distribution in EPDBMS

EPDBMS systems partition data across multiple storage nodes in the system. Data Distribution Methods determine where each tuple in a table must be stored on the system.

Distribution methods can be broadly divided into two types, (a) those that determine where to store a row of data based on the contents of that row of data (called data dependent distribution), and (b) those that determine where to store a row of data independent of the contents of the row of data (called data independent distribution).

Applying data dependent distribution methods to a table typically requires the specification of a set of columns (called distribution columns), that will be used to determine where to store any given row of data for that table. The ordered set of distribution columns is called the Distribution Vector (DV). Assume a table T with columns A, B, C, D and E, represented as T (A, B, C, D, E) was to be distributed based on the values of columns C and D. Then we say that "C and D are the distribution columns for the table T", and "the ordered set (C, D) is the DV for the table T". The DV is represented as <C, D>. A row of data in table T with values a, b, c, d, and e is represented as (a, b, c, d, e) and the DV for this row of data is represented as <c, d>.

Representation and Comparison of DVs

The DVs for a table is always in a form where each column in the DV is represented in the most general canonical form applicable for the datatype of that column.

The DV of one row is identical to the DV of another row if and only if following four conditions are met:
  Condition 1: The number of distribution columns in both distribution vectors is the same, and
  Condition 2: The corresponding distribution columns in both distribution vectors share a canonical representation, and
  Condition 3: The size of the binary representation of both the DVs is the same, and
  Condition 4: The binary representations of the DVs are identical.

The first three of these conditions above may be determined without examining a single row of data, as they represent attributes of the table(s) to which the rows belong. The fourth condition need only be evaluated if the first three conditions were evaluated successfully.

Two DV's are said to be "comparable DV's" if the first three conditions above are met.

Two DV's that are comparable and meet the fourth condition above are said to be "equal DV's".

Co-Location

Co-Location is a property of Data Dependent Distributions that ensures that:
  Two rows from a table that have the equal DV's will be stored on the same node.
  If two tables are associated with the same nodegroup, and have equal DV's, then the two rows will be stored on the same node.

Data Distribution Methods

Data Distribution Methods determine where each tuple in a table must be stored on the system. The EPDBMS allows users to distribute data in a table according to the following distribution methods:
Data Independent Distribution Methods:
  Broadcast Distribution.
  Round-Robin Distribution.
  Random Distribution.
Data Dependent Distribution Methods:
  InElastic Data Distribution Methods (IEDD)
  Elastic Data Distribution (EDD).

In broadcast distribution, all rows in a given table are to be stored on all nodes that are members of the nodegroup associated with the table.

In random distribution, a row of data for the table can be stored on any node in the nodegroup associated with the table. A variation of the random distribution method is the round-robin distribution method. Here, new data is sent to nodes in the nodegroup in a "round-robin" fashion, first to the first node, then to the second, and then finally after some data has been sent to each node, back to the first node in the nodegroup associated with the table.

Elastic Data Distribution (EDD) are a class of data dependent distribution methods that ensure co-location, and allow nodes to be added to the nodegroup when required, without requiring wholesale data redistribution. EDD methods determine where to store a row based on algorithms that enable nodes to be added to the nodegroup without the necessity to redistribute data. EDD methods are used for storage of permanent (user) tables.

InElastic Data Distribution (IEDD) Methods are a class of data dependent distribution methods that ensure co-location but do not allow nodes to be added to the nodegroup without wholesale data redistribution. IEDD methods are used for the storage of intermediate results during query processing.

In one embodiment, the distribution method for a table shall be established at the time when the table is created. The distribution method for a table may be changed so long as there is no data stored in the table at the time of the change.

In one embodiment, the DDL command used to create the table must explicitly specify the distribution method for the table.

In one embodiment, if the user fails to specify a distribution method when creating a table, the EPDBMS will choose a distribution method based on the other information provided in the SQL/DDL, used to create the table.

The Catalog Metadata Manager (FIG. 2, 206) is responsible for storing all information about a table such as its name, the columns and the distribution method. It stores this information in the Metadata Repository (208). Information relating to the distribution of data amongst the nodes in the system is managed by the Controller Node component of the Data Distribution Manager (207) and the Node components of the Data Distribution Manager (252, 262, 272, 282, 292).

Rule for Co-Location and Feasibility of Local Joins

In order that two tables are co-located for the purposes of a join, the following condition must be met.

---

{Both tables are associated with the same nodegroup} AND
{
    {One of them is broadcast distributed}
    OR
    {
        {
            {Both use same EDD with comparable DVs}
            OR
            {Both use same IEDD with comparable DVs}
        }
        AND
        {An equijoin exists between the two tables}
        AND
        {The equijoin is between corresponding columns in the two DV's}
    }
}

---

These rules can be extended to an arbitrary number of tables. If two tables are co-located for the purposes of a join, then the result of materializing the join between those two tables would naturally be distributed according to the DV of the controlling table in the join. If a third table was co-located for the purpose of joining with the materialization of the join of the first two, then the three tables are collectively co-located for the purposes of a join, and the DV for the result of that materialization could be determined.

The Dynamic Query Planning Process (DQP)

FIG. 6 shows a detailed block diagram of one embodiment of the DQP process. According to one aspect of the embodiments, queries submitted to the EPDBMS are decomposed into a set of steps. This process is called query planning, and is performed by the Dynamic Query Planner (DQP). These steps (the output of DQP) are then executed in parallel, and at the same time by a plurality of nodes in the system.

A validated query is received by the Dynamic Query Planner (DQP) in the step labeled 601. The DQP deconstructs the query and identifies all tables that are referenced in the query (602). The DQP then identifies all restrictions on a single table and associates those with the table (603). The system retrieves information from a metadata catalog that is depicted in FIG. 2 as the Catalog Metadata Manager (206) and the Metadata repository (208).

The DQP then identifies groupings of tables referenced in the query called "partitions", and constructs the grouping that contains the fewest partitions (604). A partition contains tables referenced in the query that are joined, and are co-located for the purposes of the join that is to be performed. Each table being referenced in a query is a member of exactly one partition. A partition may consist of one or more tables. If a table is referenced multiple times in a query, each reference is treated as an independent table.

If the DQP determines that multiple different groupings of tables can be created with the same number of partitions, it chooses the one where the tables are most evenly distributed among the partitions. This can occur if one or more tables referenced in the query are each joined with two or more tables each. If multiple such groupings exist, one is chosen at random.

The clauses in the query reflecting the join between tables in a single partition are now extracted from the query and associated with the partition (605).

If the DQP now determines that only one partition remains (606), query planning can be completed by identifying and recording intra-step dependencies (607) and consolidating all the steps performed to reach this point (620). If on the other hand, DQP determines that there is more than one partition, planning continues (608). The subject of intra-query dependencies is covered in more detail in paragraph [266].

Each partition is a group of tables as described in paragraph [108]. If a partition were materialized, the partition would itself be distributed according to the distribution of the controlling table, or tables in the partition.

To illustrate the preceding statement, assume that tables T1 (A, B, C, D, E), T2 (P, Q, R, S, T) and T3 (X, Y, Z) were members of a partition, and that T1<A>, T2<P> and T3 was broadcast distributed. Assume that the join conditions T1.A=T2.P and T2.Q=T3.X were determined to exist in step 605. Assume that step 603 identified the following restrictions, T1.B=17 and T2.T='abc'. Assume that the complete execution of the query required columns T1.A, T2.R, T2.S, and T3.Z. Assume that a table were created on each node in the nodegroup where T1, T2 and T3 reside, that contained the results of executing the query:
SELECT T1.A, T2.R, T2.S, T3.Z
FROM T1, T2, T3
WHERE T1.A=T2.P AND T2.Q=T3.X
AND T1.B=17 AND T2.T='abc'

That table would be considered to be the materialization of the partition containing T1, T2, and T3.

Observe that while T1.B is used in materializing the partition, the DQP determines that the value is not needed at any point in the further execution of this query and therefore T1.B is not part of the materialization of the partition.

As T1<A> and T2<P> are on the same nodegroup, and since a join condition T1.A=T2.P was found, T1 and T2 were placed in the same partition. A partition containing T1 and T2 alone would be considered to have a DV of <A> or <P>. Since T3 is broadcast distributed, it can be joined to any table on the same nodegroup. As T1, T2 and T3 are on the same nodegroup, the partition containing T1, T2 and T3 has a distribution determined by the controlling tables, which in this case are T1 and T2.

It can be proved that if step 606 determines that there is more than one partition, and there are join conditions between the direct materializations of the partitions, that these partitions are not distributed in a manner consistent with direct joining. The most straightforward proof is the proof by contradiction.

Assume that step 606 determines that there are N partitions, and N>1. This means that there is no grouping of tables possible with less than N partitions. Assume that two of these partitions are in fact distributed in a manner consistent with direct joining, and a join condition existed between these two partitions. In that event, a partition could be constructed that would consist of all the tables that are members of those two partitions, and a partitioning scheme with N−1 partitions could have been created in step 604. As step 604 constructed the grouping with the minimum number of possible partitions, this is a contradiction. Therefore we conclude that no two partitions generated in step 604, if materialized, would be distributed in a manner consistent with direct joining, if a join condition existed between these two partitions.

The DQP estimates the number of rows (608) that would exist in each partition using statistics and historical information that may be maintained by the DQP for this purpose (614). The DQP then determines whether there exist joins between the remaining partitions. If no joins are found (609), the partition predicted to be the largest is materialized using round-robin distribution (610) on the compute-nodegroup for the query. All the remaining partitions are all materialized using broadcast distribution (611) on the compute-nodegroup for the query. These two preceding steps are recorded as planning steps (612), and the query is then reformulated (613) using the newly created intermediate tables and the process begins at step 602.

It can be shown that upon executing steps 610 and 611, the query reformulated in step 613 can be reduced to a single partition when steps 603, 604 and 605 are performed. As the table materialized in step 610 is distributed using round-robin distribution on the compute-nodegroup for the query, and since the remaining tables are distributed using broadcast distribution on the compute-nodegroup for the query, these tables can be joined to form a Cartesian product on the compute-nodegroup for the query.

On the other hand, if step 609 determines that joins do exist between at least two of the partitions, the DQP chooses two of the partitions that are being joined based on statistics and historical information (614) and materializes them into intermediate tables that are distributed in a manner consistent with the join between them (615 and 616), where both intermediate tables are located on the compute-nodegroup for the query. The actions taken in step 616 are recorded for use in constructing the query plan (617). The DQP then reformulates the query using the remaining tables. It can be shown that the actions taken in steps 615 and 616 would allow steps 603, 604 and 605 to identify at least one partition that contained more than a single table and the planning process continues till we arrive at a query that includes only a single partition (in step 606).

In one embodiment, each node in the system executes a fully functional DBMS that is able to completely plan, optimize and execute queries for the data resident on that node.

All intermediate tables that are materialized during the process of query execution are materialized on the compute-nodegroup for the query, if no alternate behavior has been specified by the administrator. The administrator can specify where these results are to be materialized.

The process of query planning and execution is best understood with practical examples. For the purposes of these examples, the sample schema illustrated in FIG. 7 is used. The schema is based on the TPC-H Benchmark (www.tpc.org). The figure also specifies how the tables in the system are to be distributed in an EPDBMS. Tables REGION and NATION are broadcast on a nodegroup called NG1. The table Supplier is defined to be distributed using some EDD method with a single distribution column, and on the nodegroup NG2. All other tables are distributed using the same EDD on nodegroup NG1.

To illustrate the Parallel Query Planning process, consider the following query:
SELECT PARTKEY FROM LINEORDER WHERE ORDERKEY=12345;

This query is syntactically valid, but no table called LINEORDER exists in the system so a suitable error message is generated by the system.

Consider the following query that is submitted to the EPDBMS:
SELECT PARTKEY FROM LINEITEM WHERE ORDERKEY=12345;

The query references a single table (LINEITEM) and therefore, the query consists of a single partition and can be executed directly on all nodes where the table LINEITEM resides.

In one embodiment, DQP is complete and the query can be executed on all nodes where the table LINEITEM resides and the results can be returned to the user.

In one embodiment, DQP determines that the query includes a restriction "ORDERKEY=12345" and also recognizes that the table LINEITEM is distributed using the EDD method on a single column, ORDERKEY. The system therefore knows that all rows of the table LINEITEM with an ORDERKEY of 12345 must exist on a single node in the system, or not exist on any node in the system. The system can therefore perform further optimization and execute the query only on the one node where it is determined that rows with an ORDERKEY of 12345 exist on the system. Step (608) in the query planning process would therefore determine which node (if any) the query needs to be executed on, and may even entirely eliminate any execution if it can determine that no row with an ORDERKEY of 12345 exists on the system. The EDD method can provide the DQP with this information, and the DQP can perform this optimization.

Consider the following query that is submitted to the EPDBMS:
SELECT LINEITEM.PARTKEY, PART.NAME FROM LINEITEM, PART
WHERE LINEITEM.ORDERKEY=12345
AND LINEITEM.PARTKEY=PART.PARTKEY;

Being syntactically valid, DQP is attempted and determines that the query references two tables, LINEITEM and PART (step 602). The restriction "LINEITEM.ORDERKEY=12345" is extracted and associated with the table LINEITEM (step 603). Step 604 determines that the query consists of two partitions because the tables LINEITEM and PART are being joined on the column PARTKEY but the table LINEITEM is distributed on the column ORDERKEY, and the table PART is distributed on PARTKEY. As each partition is a single table, step 605 finds no join conditions to extract.

At this stage, we have the following two partitions:
PARTITION1: LINEITEM, WHERE ORDERKEY=12345
PARTITION2: PART We also have the remnant of the query that includes the join condition,
SELECT LINEITEM.PARTKEY, PART.NAME
FROM LINEITEM, PART
WHERE LINEITEM.PARTKEY=PART.PARTKEY;

Note that this is not intended to illustrate a complete and valid SQL statement that is identical to the SQL submitted to the system, but rather, the contents of some data structures for the purposes of illustrating the DQP process.

Step 606 determines that there are two partitions as shown above and step 608 uses some historical data to guess the number of rows that will be found in each of the partitions.

Step 609 determines that the two partitions are in fact joined and determines that the join clause would be "PARTITION1.PARTKEY=PARTITION2.PARTKEY".

Step 615 will therefore cause the system to generate two intermediate tables (call them _PARTITION_1 and _PARTITION_2) and distribute them on the compute-nodegroup for the query using an IEDD on the PARTKEY.

_PARTITION_1 is the result of executing the query "SELECT LINEITEM.PARTKEY FROM LINEITEM WHERE ORDERKEY=12345" and distributing that result on the value of the PARTKEY.

_PARTITION_2 is the result of executing the query "SELECT PART.PARTKEY, PART.NAME FROM PART" and distributing that result on the value of the PARTKEY.

Both _PARTITION_1 and _PARTITION_2 are created on the nodegroup compute-nodegroup for the query.

These steps are recorded (617) for constructing the query plan and the query is reformulated using the remaining tables, _PARTITION_1 and _PARTITION_2 as follows.
SELECT _PARTITION_1.PARTKEY, _PARTITION_2.NAME
FROM _PARTITION_1, _PARTITION_2
WHERE _PARTITION_1.PARTKEY=_PARTITION_2.PARTKEY;

PQP resumes at step 602 that identifies two tables, _PARTITION_1 and _PARTITION_2. There are no single table restrictions on either table. Step 604 determines that the two tables are joined and the joins can be executed locally. Step 605 extracts the join condition and attaches it with the newly created partition, _PARTITION_3.

Step 606 determines that there is only a single partition and therefore query planning now completes by constructing the list of steps recorded along the way. Those steps were:
ON NODEGROUP COMPUTE-NODEGROUP
CREATE TABLE _PARTITION_1 (PARTKEY)
  TO HOLD THE RESULTS OF EXECUTING THE
  QUERY "SELECT PARTKEY
  FROM LINEITEM
  WHERE ORDERKEY=12345"
ON ALL NODES IN NODEGROUP NG1
  WHERE A ROW WITH ORDERKEY 12345 MAY
    RESIDE
  AND DISTRIBUTE _PARTITION_1 ON <PARTKEY> USING SIMPLE HASH DISTRIBUTION.
ON NODEGROUP COMPUTE-NODEGROUP
CREATE TABLE _PARTITION_2 (PARTKEY, NAME)
  TO HOLD THE RESULTS OF EXECUTING THE
  QUERY SELECT PARTKEY, NAME
  FROM PART
ON ALL NODES IN NODEGROUP NG1
  AND DISTRIBUTE _PARTITION_2 ON <PARTKEY> USING SIMPLE HASH DISTRIBUTION.
ON NODEGROUP COMPUTE-NODEGROUP
EXECUTE THE QUERY
  SELECT _PARTITION_1.PARTKEY, _PARTITION_2.NAME FROM _PARTITION_1, _PARTITION_2
  WHERE _PARTITION_1.PARTKEY=_PARTITION_2.PARTKEY
AND RETURN THOSE RESULTS TO THE USER WHO
  SUBMITTED THE QUERY.
ON NODEGROUP COMPUTE-NODEGROUP
DROP TABLE _PARTITION_1
DROP TABLE _PARTITION_2

In the case of queries that include more complex SQL constructs, such as aggregations, more complex query plans are constructed by the DQP.

Consider the following query that is received by the EPDBMS:
SELECT CUSTKEY, COUNT(*)
FROM LINEITEM
GROUP BY CUSTKEY;

The query consists of a single table and therefore query execution can be performed in parallel on all nodes where the table LINEITEM resides.

However, each node would only be able to determine the results of executing this query on the data on that node.

In order to completely execute this query, the DQP needs to generate a plan that includes additional steps. The query plan for this query would include these steps:
ON NODEGROUP COMPUTE-NODEGROUP
CREATE TABLE_TEMP_TABLE_1 (CUSTKEY, COUNTER)
  TO HOLD THE RESULTS OF EXECUTING THE
  QUERY "SELECT CUSTKEY, COUNT(*)
  FROM LINEITEM
  GROUP BY CUSTKEY"
ON ALL NODES IN NODEGROUP NG1
AND DISTRIBUTE THE TABLE_TEMP_TABLE_1
  ON <CUSTKEY> USING SIMPLE HASH DISTRIBUTION
ON NODEGROUP COMPUTE-NODEGROUP
EXECUTE THE QUERY
  "SELECT CUSTKEY, SUM (COUNTER) AS
  "COUNT(*)" FROM TEMP_TABLE_1
  GROUP BY CUSTKEY"
AND RETURN THOSE RESULTS TO THE USER WHO
SUBMITTED THE QUERY.

All nodes in the system where the table LINEITEM exists, execute the first query and the EPDBMS materializes those results in a temporary table on the compute-nodegroup. The second step of the plan then issues a second aggregation query and returns the results to the user.

Since _TEMP_TABLE_1 was created with a data dependent distribution on <CUSTKEY>, all rows in _TEMP_

TABLE_1 with a given CUSTKEY will exist on the same node of the compute-nodegroup for the query.

Intermediate Tables and Intermediate Processing

The EPDBMS software can determine where intermediate tables created during the execution of a query are to be stored, and intermediate computations performed. This may either be the system default (default-compute-nodegroup) or some other nodegroup specified by the administrator. The administrator may specify what nodegroup each query, group of queries, session, group of sessions, user or group of users will consider to be the compute-nodegroup.

The DQP will capture information about the compute nodegroup to be used at the beginning of query planning The DQP captures the name of the nodegroup, and the members (nodes) of that nodegroup. It indicates that it may be placing intermediate tables on these nodes by incrementing a reference counter on those nodes. It indicates that it is referencing the nodegroup by incrementing a reference counter on the nodegroup. These reference counters are decremented upon completion of execution of the query. In this way, the EPDBMS can record its "affiliation" to specific nodes that are members of the compute nodegroup, and the nodegroup that is being used as the compute nodegroup.

Upon commencing execution of a query, a reference counter associated with each table being referenced in the query is incremented. If a table is referenced multiple times in a query, the reference counter is incremented only once. This reference counter is decremented upon completion of execution of the query, for each table that was referenced in the query. The EPDBMS can record that a query is being executed that utilizes a specific table in the system.

Elastic Compute Capacity (ECC)

According to the foregoing explanation of query planning and the placement of intermediate tables and the location where intermediate computations are performed, one can immediately appreciate that the administrator may seamlessly change the available compute capacity in the system.

The available compute capacity in the system could be changed in one of two ways: (a) by adding additional compute-nodegroups, and associating different users with different compute-nodegroups, and (b) by adding nodes to existing compute nodegroup(s).

This is called Elastic Compute Capacity (ECC) and enables the EPDBMS to scale up and down in response to high or low workload situations. Such "resizing" is simple, quick and can be performed while the system is continuing to process database operations.

FIG. 8 illustrates compute capacity expansion in one embodiment. Assume an EPDBMS with fifty nodes named node0, node1, node2, . . . node49. The following nodegroups are defined on this system:

nodegroup-1: node40, node41, node42, . . . node49
default-storage: node0, node1, node2, . . . node39

For the purposes of this illustration assume that the default-compute-nodegroup on the system is the nodegroup called nodegroup-1. All queries on the system utilize the same nodegroup, called nodegroup-1 as the compute nodegroup.

First, the administrator prepares additional nodes to bring into the EPDBMS (Step 801). In the illustration in FIG. 8, the administrator provisions five additional nodes to bring into the EPDBMS. The activities involved in performing step 801 are shown on the right of FIG. 8, alongside the step 801. First the nodes are provisioned. Then, the EPDBMS is instructed that the new nodes are to be called node50, node51, . . . node54. These nodes are then brought online.

At the end of step 801, nodes50 through node54 are un-enrolled nodes in the system. Step 802 enrolls these nodes and creates a new nodegroup. The command issued on the right by the administrator creates this nodegroup (called 'newcompute'), and includes on it the fifteen nodes whose names are enumerated as part of the command. The system informs all nodes that a new nodegroup has been created, and informs them of the membership of that nodegroup.

At the end of step 802, the newly created nodegroup 'newcompute' is ready to become the new default-compute-nodegroup for the system. The administrator performs step (803) to inform the EPDBMS system that the default compute nodegroup to use is the new nodegroup, 'newcompute'.

All queries launched after this command completes will use the nodegroup newcompute as the compute-nodegroup. Queries that are already in flight will complete their operations using whatever compute nodegroup was in effect when those queries started execution.

The final state of the system is illustrated (804) and shows that the default-compute-nodegroup is 'newcompute'.

FIG. 9 illustrates how an administrator could reduce available compute capacity on the system in one embodiment. After the increased workload situation that led to the capacity increase illustrated in FIG. 8, assume that the workload on the system decreases, and the administrator decides to reduce the available compute capacity in the system.

At the beginning of the illustration in FIG. 9, the default-compute-nodegroup is newcompute and consists of fifteen nodes. The administrator could immediately reduce the available compute capacity to ten nodes by setting the default-compute-nodegroup to nodegroup-1. However, the administrator determines that only five nodes need to be part of the compute nodegroup, and the administrator decides to use nodes node50 . . . node54 for this purpose. Having created a new nodegroup 'compute2' (step 902), the administrator activates that nodegroup (step 903) and all queries launched after this command completes will use the nodegroup 'compute2' for storage of intermediate tables. Queries that are in flight at the time when this change is made will complete, and should a new query be launched in those same sessions, those new queries would use the nodegroup 'compute2'.

By associating the location of intermediate tables and intermediate processing with a compute-nodegroup, and providing a mechanism by which the compute-nodegroup can be changed without requiring system outages, or complex operations, the EPDBMS enables the system to be truly elastic in adapting to variable workloads that may be placed on the system.

By associating reference counts on the nodes that a query is using, the EPDBMS knows whether a given node is in-use or not, at any given time.

Once all queries that were running during the changes illustrated in FIG. 9 have completed, the reference count on the nodegroup 'newcompute' will drop to zero.

Deletion of Nodegroups and Nodes

When the reference count and the table count associated with a nodegroup are zero, the administrator can delete a nodegroup.

When a nodegroup is deleted, the group counter value for all members of the nodegroup is decremented.

When a node has a zero reference count and a zero group count, the administrator can delete the node.

When a node is deleted, the EPDBMS informs the software executing on that node that its services are no longer needed by the system, and the software on that node can perform an orderly shutdown. Once a node has been logically deleted from the system, the system administrator can de-provision the node.

Reference Counts for Compute-Nodegroups and Storage-Nodegroups

When a nodegroup is assigned a role, either as a compute-nodegroup or a storage-nodegroup, it is important that this be recorded as a reference count.

The fact that a nodegroup is assigned the role of "compute-nodegroup" or "storage-nodegroup" itself causes reference counters on the nodegroup and all participating nodes to be incremented. This ensures that those nodegroups and nodes are not accidentally deleted or de-provisioned while there are no running queries on the system.

Dynamic Capacity Expansion (DCE) and Elastic Data Distribution (EDD)

One aspect of the EPDBMS is a new class of data dependent distribution method called "Elastic Data Distribution" (EDD). Tables distributed with EDD can be configured to utilize additional storage capacity that is managed through Dynamic Capacity Expansion (DCE), while ensuring co-location and not require wholesale redistribution of data.

Dynamic Capacity Expansion (DCE)

An administrator may add nodes to an existing storage nodegroup. This process is called Dynamic Capacity Expansion (DCE). FIG. 10 illustrates the process of DCE in a high level block diagram according to one embodiment. The administrator first determines that five nodes are to be added to the nodegroup, 'default-storage'. The nodes to be added to the system may be existing nodes already in the system or new nodes that are to be added to the system. The illustration assumes that new nodes are to be used and so, new nodes are first provisioned and prepared for induction into the system (1001).

At the end of this step (1001), the five nodes are un-enrolled and ready for use. Step 1002 adds these nodes to the nodegroup, 'default-storage'. When the command completes, the nodegroup default-storage now includes the additional five nodes, and tables using the nodegroup default-storage can now store data on those nodes as well as the previous fifty nodes.

When nodes are added to an existing nodegroup, a series of steps are performed by the system. FIG. 11 illustrates these steps in an embodiment, and extends on the example provided in FIG. 10.

Five nodes (node50, . . . node54) are to be added to the nodegroup 'storage-nodegroup' (1101). First, all random and round-robin distributed tables associated with this nodegroup are identified and empty tables are created on the new nodes. These empty tables will be used in the future to store data on the new nodes (1102). Similarly, all broadcast distributed tables associated with this nodegroup are identified and empty tables are created on the new nodes. These empty tables are then populated with data to match the other nodes in the nodegroup (1103). Similarly, all EDD tables associated with this nodegroup are identified and empty tables are created on the new nodes (1104). All data structures maintained by the system that relate to the EDD tables are updated to reflect the new membership of the nodegroup (1105). All nodes in the system are informed of the new membership of the nodegroup (1106), and this ends the process of DCE (1107) with the new nodes being part of the nodegroup.

Elastic Data Distribution (EDD)

When a table is created, it is associated with a nodegroup. This association is established at the time when the table is created. Data in the table is stored on the nodes that are members of the nodegroup.

FIG. 12 is a high level block diagram illustrating where tuples are stored on EDD tables to ensure co-location, in one embodiment. For the purposes of this illustration, a table T1 (A, B, C, D, E) is distributed according to EDD<A, B> and associated with the nodegroup storage-nodegroup.

In step (1201), we construct the DV for the row <a, b>. We then determine whether a row with the DV<a, b> was ever stored in a table on the nodegroup 'storage-nodegroup' (1202). We choose 'storage-nodegroup' as it is the nodegroup associated with the table T1, which is the table to which the present row is destined.

If we determine that a row with this DV was previously encountered in connection with the nodegroup, 'storage-nodegroup', the system determines where that row was stored (1203) and stores this present row (a, b, c, d, e) on that same node.

If, on the other hand, step 1202 determines that no row with this DV was ever stored in a table on nodegroup 'storage-nodegroup', the EPDBMS decides where to store the row (1204).

Distribution Maps

The distribution map is a data structure that tracks information about DV's seen in connection with all tables associated with a nodegroup.

The distribution map may be implemented as a simple linked list or array of DVs seen in association with the associated nodegroup.

The distribution map may be a tree data structure, where each leaf is a DV that was seen in association with the associated nodegroup.

Allocation Strategies

An allocation strategy is a set of rules that specify where a given row in a table distributed with EDD would be stored, if it has been determined that the DV of that row was never encountered before in connection with the nodegroup.

Further, an allocation strategy is a deterministic set of rules that can be evaluated based on the candidate row of data and the state of the nodegroup.

FIG. 13 is another high level block diagram illustrating where tuples are stored on EDD tables to ensure co-location.

In step (1301), we construct the DV for the row <a, b>. We then determine whether a row with the DV<a, b> was ever stored in a table on the nodegroup 'storage-nodegroup' (1302). We choose 'storage-nodegroup' as it is the nodegroup associated with the table T1, which is the table to which the present row is destined. This determination is made by inspecting the Distribution Map associated with the nodegroup as that data structure tells us about all DV's that were ever seen in connection with the nodegroup.

If we determine that a row with this DV was previously encountered in connection with the nodegroup, 'storage-nodegroup', the system determines where that row was stored (1305) and stores this present row (a, b, c, d, e) on that same node, and this concludes the process (1306).

If, on the other hand, step 1302 determines that no row with this DV was ever stored in a table on nodegroup 'storage-nodegroup', the EPDBMS decides where to store the row (1303). This determination is made based on the Allocation Strategy for the nodegroup. The location where this DV is being stored is recorded for later use (1304), and this concludes the process (1306).

Generations

Associated with each nodegroup, the EPDBMS maintains a series of "generation" data structures. When a nodegroup is first created, it is in its first generation. Associated with a generation of a nodegroup are: (a) a list of participating nodes, (b) a distribution map, and (c) an allocation strategy.

As a nodegroup is a non-empty collection of nodes, every generation of a nodegroup includes a non-empty list of participating nodes.

When nodes are added to a nodegroup through the process of DCE, a new generation is created. The new generation records the new list of participating nodes, has a new (empty) distribution map and an allocation strategy. If the administrator does not specify an allocation strategy, the default strategy is used.

An administrator may choose to modify the allocation strategy on a nodegroup at any time without adding nodes. When the allocation strategy on a nodegroup is changed, a new generation is created. The new generation records the list of participating nodes, has a new (empty) distribution map and a new allocation strategy.

Information about nodegroups and the current and past generations of the nodegroup are stored in a System Topology Manager (203). The management of the distribution maps and the allocation strategy are handled by the Data Distribution Manager (207, 252, 262, 272, 282 and 292) that resides on the Controller Node and the other Nodes in the system.

FIG. 14 extends on the preceding description, and is a detailed block diagram illustrating where tuples are stored on EDD tables to ensure co-location.

When presented with a row of data (a, b, c, d, e) destined for the EDD table T1 (A, B, C, D, E) where the DV is <A, B>, the first step (1401) is to compute the DV<a, b>. A counter of generations is initialized to 1 (1402) and the distribution map (DM) associated with the first generation of the nodegroup is retrieved (1403). The DM retrieved in step 1403 is inspected for the presence of an entry for the DV<a, b>. If one exists, then step 1405 will determine where that row would have been stored based on the allocation strategy associated with that generation, and the new row is sent to that same place, which ends the process (1406). If on the other hand, no entry for the DV<a, b> is found in the generation associated with the counter 'gencounter' in step 1404, step 1407 checks to see whether another generation exists. If there is one, step 1408 increments the counter and the process resumes at step 1403. If on the other hand, step 1407 determines that no further generations exist, we can conclude that this row (a, b, c, d, e) is the first occurrence of the DV<a, b> and step 1409 retrieves the allocation strategy for the current generation and stores the row in the location determined by that allocation strategy. Step 1410 updates the DM associated with the current generation reflecting the first occurrence of the DV<a, b> and this completes the process (1406).

FIG. 15 extends on the preceding description and FIG. 11, and provides more details of the steps performed during capacity expansion. For the purpose of this illustration, five nodes are being added to the nodegroup called 'default-storage', as shown in FIG. 10.

The process begins (1501) after the user has provisioned the additional five nodes and executed the command to add five nodes to the nodegroup 'storage-nodegroup'.

The system identifies (1502) all random and round-robin distributed tables on the 'storage-nodegroup' and creates empty tables on the newly added nodes. These tables have no data in them at this stage.

The system then identifies all broadcast (1503) distributed tables on the storage-nodegroup and creates and populates replicas on the newly added nodes. At the end of this step, all nodes in the storage-nodegroup have identical (in structure and content) broadcast distributed tables.

The system then identifies (1504) all EDD tables on storage-nodegroup and creates empty tables on the newly added nodes.

The tables created in steps 1502, 1503 and 1504 have the same table structure as they have on the existing nodes in the storage-nodegroup.

The system then creates (1505) a new generation for the storage-nodegroup and populates an empty distribution map for that generation.

The new nodes are then added (1506) to the node member list for the nodegroup. If the administrator specified an allocation strategy, step 1507 uses that strategy, and if not, a system default strategy is used.

In preparation for switching to a new distribution map, the system (1508) updates and flushes the distribution map for the current generation. Finally, all nodes are informed of the new generation of the storage-nodegroup, and when all nodes acknowledge the change, the change is recorded as complete by the EPDBMS (1510). This completes the process for dynamic capacity expansion (1511).

Determining where to Store a Row in an EDD Table

The algorithm depicted in FIGS. 12, 13, and 14 are best understood as a dialog between two parts of the EPDBMS. The following dialog between the EPDBMS and EDD logic is illustrative of the placement process.

Option A:
 EPDBMS: EDD, a row of data for T1(A, B, C, D, E) has been received. The table T1 is EDD distributed on storage-nodegroup and the DV is <A, B>. Please tell me where this row of data (a, b, c, d, e) should be placed?
 EDD: EPDBMS, I have never encountered a row with the DV<a, b> associated with any table associated with storage-nodegroup. This I can say for certain. You should place this row on the node indicated by the Allocation Strategy for the current generation of the nodegroup.

Option B:
 EPDBMS: EDD, a row of data for T1(A, B, C, D, E) has been received. The table T1 is EDD distributed on storage-nodegroup and the DV is <A, B>. Please tell me where this row of data (a, b, c, d, e) should be placed?
 EDD: EPDBMS, I have determined that a row with an identical DV<a, b> has been seen before and the row of data was placed on node "nodeX".
 EPDBMS: EDD, Thank you. I will place the row of data (a, b, c, d, e) on nodeX, so it is co-located with the previous row with the DV<a, b>.

The above illustrative dialog between the EPDBMS and the EDD would ensure that co-location was guaranteed for all data on table T1, and for all data in any other table associated with the same nodegroup as T1 (storage-nodegroup) with a comparable DV. As the numbers of rows in the database increases, and as the number of distinct DVs increases, it is extremely expensive to maintain a complete record of each DV that was ever encountered by the system.

According to one embodiment, co-location can be guaranteed without knowing all the DV's that were actually seen by the system. We demonstrate below that it is sufficient to know positively that a DV was never seen, or when (in which generation) it may have been first seen, in order to guarantee co-location.

In other words, we demonstrate that in order to guarantee co-location of data with identical DVs, it is sufficient if the EDD logic could respond to the question (in the hypothetical dialog described above) in the following fashion. We present below, another hypothetical dialog between the EPDBMS code and the EDD code.

Option A:
EPDBMS: EDD, a row of data for T1(A, B, C, D, E) has been received. The table T1 is EDD distributed on storage-nodegroup and the DV is <A, B>. Please tell me where this row of data (a, b, c, d, e) should be placed?
EDD: EPDBMS, I have never encountered a row with the DV<a, b> associated with any table associated with storage-nodegroup. This I can say for certain. You should place this row on the node indicated by the Allocation Strategy for the current generation of the nodegroup.

Option B:
EPDBMS: EDD, a row of data for T1(A, B, C, D, E) has been received. The table T1 is EDD distributed on storage-nodegroup and the DV is <A, B>. Please tell me where this row of data (a, b, c, d, e) should be placed?
EDD: EPDBMS, I may have encountered a row with DV<a, b> in connection with storage-nodegroup. If I did, the first time that I encountered it was in generation X, and in that generation, the row would have been stored on node "nodeY". I can definitely tell you, that before generation X, I never encountered the DV<a, b> in connection with storage-nodegroup.
Further, I can guarantee that if, at any time in the past, you asked me about the DV<a, b> in connection with this nodegroup, I would have either told you that I never encountered it before, or I would have told you that a previous row with that DV may have been stored on nodeY, and in generation X. I can also guarantee that if I ever told you that I had encountered this DV<a, b>, I would never have told you that this row was encountered in any generation other than generation X. I hope this helps.

If Option A in the above hypothetical dialog were to occur, then some algorithm or algorithms have determined that the current row (a, b, c, d, e) is the very first instance of the DV<a, b>. EPDBMS is therefore free to store (a, b, c, d, e) on any node in the system in accordance with the allocation strategy in effect in the current generation.

On the other hand, if Option B in the above hypothetical dialog were to occur, the EPDBMS would necessarily have to store the row in "NodeY".

When determining where to store a row in an EDD distributed table, there is therefore a tolerance for false positives in the determination whether a prior row with an identical DV was ever encountered. But, there is absolutely no tolerance for a false negative in that determination.

A new row being inserted into an EDD table is stored on the node specified by the allocation strategy of the earliest generation in which it cannot be determined with absolute certainty that the DV has never been seen, or according to the allocation strategy of the current generation if the DV has never been seen in any generation. For the purposes of this statement, it is implicitly assumed that all references to allocation strategy and generation are in relation to the nodegroup associated with the table to which the row is being inserted.

We now describe the algorithm described above using the illustration in FIG. 16.

In this illustration, a new row of data (a, b, c, d, e) is received by the system for table T1(A, B, C, D, E) associated with storage-nodegroup, which is EDD and the DV is <A, B>. First, the system computes the DV of the row <a, b> (1601), and then determines whether this DV was ever seen before (1602). If the DV was never seen before, we can store the row on any node and still guarantee co-location (1604). If, on the other hand, step 1602 determines that the DV may have been seen before, then we would store new row on the same node where the previous row would have been stored (1603).

FIG. 17 is a detailed block diagram that illustrates the steps involved in determining where to place a row of data in an EDD table. It extends on the illustration in FIG. 16.

When presented with the row (a, b, c, d, e) the first step (1701) is to compute the DV<a, b>. A counter is initialized to 1 and used for an iterative search through the generations of the nodegroup. Step 1703 determines whether the DV<a, b> has been encountered in connection with the generation indicated by the counter 'gencounter'. If the row has NOT been encountered in that generation, then the process continues to step 1704, where we determine whether there are more generations to search. If YES, processing continues to 1705 where the gencounter is incremented and processing resumes at step 1703. If on the other hand, step 1704 determines that no further generations exist, then we have determined that this DV was never seen before and step 1706 determines where to send the row in accordance with the AS for the current generation of the nodegroup. Step 1707 records the first occurrence of the DV<a, b> in the current generation, and the process ends (1709). On the other hand, if step 1703 determines that the DV may have been seen, then the row will be dispatched according to the Allocation Strategy for the generation indicated by 'gencounter' (1708) and this completes the process.

FIG. 18 extends the illustration of FIG. 17 and provides an embodiment of the algorithm(s) used in determining where to store a row in connection with an EDD table. A row of data with a DV<a, b> is received (1801). In step 1802, five hashes are computed, and these hashes are (h1, h2, h3, h4 and h5). For the purposes of illustration, assume that each of these hashes is a sixty-four bit value and is represented as an unsigned sixty-four bit integer. Assume further that the distribution map is a bitmap containing one million bytes (1,000,000 bytes) or eight million bits (total-bits). Step 1803 translates each of the five hash values into a specific bit in this bitmap. In this illustration, the hash value $h_i$ is translated into a specific bit ($b_i$) in the bitmap as:

$$b_i = h_i \text{ MOD total-bits}$$

where MOD is the remainder on integer division (MODULUS) operator

Having computed the values of the five bits (step 1803), the process prepares to perform an iterative search of the distribution maps associated with each generation of the nodegroup starting with generation 1. Step 1804 initializes the generation counter to 1 and step 1807 checks to see whether all the bits (b1, b2, b3, b4, and b5) are set in the distribution map associated with the generation specified by gencounter. If all the bits are set, it is possible that this present DV<a, b> may have been seen in the generation specified by gencounter. Step 1808 proceeds to dispatch the row to the same location where the previous row would have been dispatched, if it had been seen when that generation of the distribution map was current, and the process ends (1811).

In step 1807, if even one of the five bits (b1, b2, b3, b4 and b5) is not set, the DV<a, b> was certainly not seen in that generation of the distribution map, so step 1806 checks to see whether there are more generations. If yes, the process increments gencounter (1805) and starts again at step 1807.

If on the other hand, step 1806 determines that there are no more generations, then this DV<a, b> has never been seen before and step 1809 sets the five bits in the current generation of the bitmap. Step 1810 determines where to dispatch this row according to the allocation strategy for the current generation of the bitmap, and this concludes the process (1811).

Without loss of generality, the five hash functions chosen above in this embodiment may be replaced by any deterministic function that operates on a DV and produces some value, and where each DV is associated with a single value but many DV's may produce the same value.

Allocation Strategies in Greater Detail

An Allocation Strategy (as defined in [187]) is a set of rules that specify where a given row in a table distributed with EDD would be stored, if it has been determined that the DV of that row was never encountered before in connection with the nodegroup.

We refine that definition here by stating that an Allocation Strategy is a deterministic algorithm that may be evaluated solely based upon the value of the DV, and any information related to the current generation of the nodegroup (such as the number of nodes in the nodegroup, etc.)

The administrator may specify that all nodes in the nodegroup are available to receive rows related to DV's that have never been seen before. This is the default allocation strategy.

The administrator may specify which nodes in the nodegroup are available to receive rows related to DV's that have never been seen before.

The administrator may specify which nodes in the nodegroup are not available to receive rows related to DV's that have never been seen before.

DCE and EDD Working Together

Having now described all the components of DCE and EDD, FIGS. 19, 20 and 21 provide a single detailed example illustrating the insertion of the first eighteen rows into two tables on a nodegroup. Both of the tables are EDD distributed using the same EDD method.

In the illustration of an embodiment that is provided here, T1(A, B, C, D, E) is EDD<A, B> and T2 (P, Q, R) is EDD<P, Q>. The DV's of T1 and T2 are comparable and T1 and T2 are associated with the same nodegroup.

The illustration begins on FIG. 19 in step 1901. A new nodegroup, 'storage' has been created and is in its first generation. The tables T1 and T2 have been created.

The allocation strategy in the implementation is to send data to the node in the nodegroup identified by computing the reminder after division of the value of the first distribution column by the number of nodes. As there are four nodes in storage nodegroup at this time, the row (a, b, c, d, e) would be sent to the node a%4 where "%" is the integer modulo operator (reminder after integer division)

If (a%4) is 0, the row is sent to node0,
If (a%4) is 1, the row is sent to node1
and so on.

The first row of data (1, 1, 2, 3, 6) is received for T1. As the DV<1, 1> has never been seen before, the row is sent to node (1%4) or node1 (steps 1902 and 1903).

The next row of data (2, 1, 2, 3, 6) is received for T1. As the DV<2, 1> has never been seen before, the row is sent to node (2%4) or node2 (steps 1904 and 1905).

The next row of data (4, 3, 2, 3, 6) is received for T1. As the DV<4, 3> has never been seen before, the row is sent to node (4%4) or node0 (steps 1906 and 1907).

The next row of data (4, 3, 7, 5, 2) is received for T1. The DV<4, 3> was seen before in generation 1. The allocation strategy for generation 1 would have sent the row to node (4%4) or node0. This row is sent to the same place. (steps 1908 and 1909).

The next row of data (3, 3, 6, 3, 2) is received for T1. The DV<3, 3> has never been seen before, the row is sent to node (3%4) or node3 (steps 1910, 1911).

Finally, the sixth row of data (3, 3, 3, 3, 2) is received for T1. The DV<3, 3> was seen before in generation 1. The allocation strategy for generation 1 would have sent the row to node (3%4) or node3. This row is sent to the same place (steps 1912 and 1913).

This concludes the illustration on FIG. 19.

FIG. 20 continues the illustration from FIG. 19 on an embodiment. The administrator adds a node (node4) to the nodegroup according to the methods provided by DCE. The administrator uses the default allocation strategy for the second generation of the nodegroup 'storage'. In the default allocation strategy, data is sent to the node identified by the value of the first distribution column %5, as there are now five nodes in the nodegroup (step 2001).

A row of data (2, 1, 6) is received for T2. The DV<2, 1> was seen in generation 1. The allocation strategy for generation 1 would have sent the row to node (2%4) or node2. This row is sent to the same place (steps 2002, 2003).

A row of data (2, 1, 2, 3, 6) is received for T1. The DV<2, 1> was seen in generation 1. The allocation strategy for generation 1 would have sent the row to node (2%4) or node2. This row is sent to the same place (steps 2004, 2005).

A row of data (7, 3, 2, 3, 6) is received for T1. The DV<7, 3> has never been seen before, the row is sent to node (7%5) or node2 (steps 2006, 2007).

A row of data (7, 6, 7, 5, 2) is received for T1. The DV<7, 6> has never been seen before, the row is sent to node (7%5) or node2 (steps 2008, 2009).

A row of data (9, 3, 6, 3, 2) is received for T1. The DV<9, 3> has never been seen before, the row is sent to node (9%5) or node4 (steps 2010, 2011).

A row of data (3, 3, 2) is received for T2. The DV<3, 3> was seen in generation 1. The allocation strategy for generation 1 would have sent the row to node (3%4) or node3. This row is sent to the same place (steps 2012, 2013).

This concludes the illustration on FIG. 20.

FIG. 21 continues the illustration from FIG. 19 and FIG. 20 on an embodiment. The administrator determines that node 2 needs no more new data as it appears to have a higher fraction of the data already. The administrator modifies the allocation strategy (step 2101) for the nodegroup by specifying that data should be sent to nodes other than node 2. This leaves four nodes in the nodegroup that can receive data and therefore the allocation strategy computes the value of <first distribution column> %4 and depending on the value (0, 1, 2 or 3) sends the row to node (0, 2, 3 or 4). This leads to the creation of generation 3.

A row of data (2, 1, 6) is received for T2. The DV<2, 1> was seen in generation 1. The allocation strategy for generation 1 would have sent the row to node (2%4) or node2. This row is sent to the same place (steps 2102, 2103).

Steps 2104 through 2113 are self-explanatory, and follow directly from the actions in FIGS. 19 and 20.

Step 2102 and 2103 illustrate an important aspect of the EDD. While the administrator has specified that new data is not to be sent to the node Node 2, that only applies to new (and never seen before) DV's. The DV<2, 1> has been seen before, and must therefore be stored only on Node 2.

Reinitializing a Nodegroup

When there are no tables stored on a nodegroup, all information that is retained about prior generations of the nodegroup, and previous data that was stored on the nodegroup is obsolete.

When the tablecount on a nodegroup returns to zero (is decremented from 1 to zero) when the last table on it is deleted, the nodegroup is reinitialized.

When a nodegroup is reinitialized, all generations other than generation 1 are discarded, and all participating nodes in the nodegroup may be included in the first generation of the newly reinitialized nodegroup. The default allocation strategy is applied to the newly reinitialized nodegroup.

Storing Distribution Maps

From the preceding sections, the detailed description and the illustration in FIGS. 17, 18, 19, 20, and 21, it will be apparent that the only distribution map that is ever updated is the distribution map associated with the current generation.

Different generations of the distribution map may be stored in different formats. In one embodiment, extremely efficient compressed bitmaps may be used for all generations of the distribution map, except the current generation. The current generation, may be an uncompressed bitmap or a collection of uncompressed bitmaps.

ACID Implications for EDD

An EPDBMS that provides complete ACID (Atomicity, Consistency, Isolation and Durability) semantics.

All changes that are made to a distribution map as part of a database transaction are committed to the database as part of that database transaction. The Transaction Coordinator (1605) is responsible for ensuring that transactions are either completely committed or not committed at all. The Transaction Coordinator works with the Query Execution Engines on each node and the Client Connection Manager on the Controller Node to ensure that data integrity is preserved.

Heterogeneous Persistent Data Stores

FIG. 22 provides an illustration of a parallel elastic database management system illustrating heterogeneous persistent data stores, according to one embodiment. In this figure, an EPDBMS is shown where one storage node, 2201 is part of a nodegroup called email-nodegroup that is associated with a single table called EMAIL. This table is a relational representation of data that is stored in some external email server that speaks the well-known IMAP protocol.

In practice, IMAP mail servers such as the mail services provided by companies like Google have extremely efficient search algorithms that are tailored towards email messages.

A client 2260 submits a query that contains a "join" between two "tables", one is CUSTOMER, and the other is EMAIL. CUSTOMER is associated with the storage-node-group, and stored on storage nodes 2202, 2203 and 2204.

The submission of this database query (2261) causes the DQP (2251) to construct a query plan (2252). Observe that Step 1 of the query plan is expressed in a language understood by the node software on node 2201 that resembles (closely) the native language of the Email Server (2220) that actually stores the data for the table EMAIL. Steps 2 and 3 are expressed in a language understood by the node software on nodes 2202, 2203, 2204, 2231 and 2232.

The IMAP server performs the search in the most efficient manner as suited for email messages, and the persistent data stores on nodes 2202, 2203 and 2204 perform the query in Step 2 using algorithms best suited for them.

Intra-Query Parallelism

The query plan depicted in FIG. 4 (404) constructed by the DQP process (403) has determined that Step 2 depends on Step 1.

The query plan depicted in FIG. 22 (2252) constructed by the DQP process (2251) has determined that Steps 1 and Step 2 may be executed with no dependencies on each other, but Step 3 has a dependency on Steps 1 and 2.

This aspect of the DQP process allows multiple sets of operations to be executed in parallel, and at the same time, depending on available resources on the system.

Execution Location of Software Components

In the preceding description we have defined a Node to be, "a logical collection of software components that are executing on some computing resources, such as CPU, Memory, Network Interface, and Storage". See paragraph [10].

We now proceed to specify this architecture in more detail.

We have several kinds of software programs that each play a part in the operation of the EPDBMS. We have software components on the Controller Node that provide services such as Dynamic Query Planning, System Topology, Catalog Metadata, and Data Distribution (among others). On the Storage/Compute Nodes, we have software that provides Query Execution and Data Distribution services in addition to the persistent data repositories.

A "Machine" in the EPDBMS is a unit of computing infrastructure that provides computing resources such as CPU, Memory, Network Interface and Storage. This Machine may be either a physical machine (real hardware) or a Virtual Machine. Without loss of generality, we state that the Machine provides computing resources including storage, while recognizing that in practice the storage may be only virtual storage where data are physically resident on physical storage media in some other location. Each Machine in the EPDBMS has a component of management software called the Machine Manager which is responsible for all management functions related to activities on that Machine.

The Nodes in the EPDBMS are therefore (as described in paragraph [10]) a logical collection of software components that are executing on the resources provided by the Machines.

FIG. 23 shows an EPDBMS system with 5 Nodes, and 5 Machines. As can be seen here, the Nodes and the Machines are paired up with each Node having a dedicated Machine. Controller Node 2310 has access to machine 2301, and the Storage/Controller Nodes 2320, 2330, 2340 and 2350 have access to the Machines 2302, 2303, 2304 and 2305 respectively. As described above, each Machine has a dedicated Machine Manager (2371, 2372, 2373, 2374, and 2375).

FIG. 24 shows another EPDBMS with 5 Nodes and 4 Machines. In this system, the Nodes 2430 and 2440 share the same Machine, 2403. As described above, each Machine has a dedicated Machine Manager (2471, 2472, 2473, and 2474).

FIG. 25 shows another EPDBMS with 5 Nodes and 3 Machines. In this EPDBMS system, the Controller Node has dedicated access to Machine 1 while the other four Nodes (Storage/Compute Nodes) have Query Execution Engines on Machine 2 and have their Data Distribution Managers and Persistent Data on Machine 3. Also depicted in this figure is the fact that (as described in paragraph [70]), a node may include multiple Query Execution Engines. In FIG. 25, we show that the Node 2520 has two Query Execution Engines and the Node 2530 has three. As described above, each Machine has a dedicated Machine Manager (2571, 2572, and 2573).

As illustrated in FIGS. 23, 24 and 25, Machines provide the computing infrastructure, and the software components of the Nodes are associated with specific Machines.

Machine Managers

As described above, each Machine has a dedicated Machine Manager. The Machine Manager is responsible for all management functions related to activities on that Machine. A Machine Manager software program is launched on a Machine at the time when the Machine is provisioned to be part of the EPDBMS, and this program continues to operate till the Machine is released from the EPDBMS.

FIG. 26 is an illustration of some aspects of a Machine Manager on a single Machine. A Machine Manager program maintains a reference counter to track each software resource that the EPDBMS has chosen to associate with that Machine (2601). When a new Machine is launched, these reference counters are all initialized to zero and are incremented each time a software resource is associated with the node, and decremented each time a software resource is dis-associated from the node.

When a new Machine is launched, the Machine Manager launches a certain number of "Job Threads". A Job Thread is a software program that can be instructed to take on the role of a software resource that is part of the EPDBMS.

The Machine Manager maintains a list of available "Job Threads" (2603). In addition, it maintains lists of software resources that are associated with the Machine (2602, 2604, 2605).

When the EPDBMS chooses to associate a software resource with a Machine, the Machine Manager on the Machine receives the request. The process of provisioning an Execution Engine is depicted in FIG. 27 and starts at step 2720. The system is depicted (on the left) with a Machine Manager (2701) with 4 Execution Engines (2702), 4 Distribution Managers (2704), 2 Persistent Stores (2705) and 4 Job Threads (2703).

When the request for a new Execution Engine is received (2720), the Machine Manager identifies whether a Job Thread is available (2721), and finding an available Job Thread, it assigns the Job Thread (which removes it from the list of Job Threads) (2722), and creates a new Execution Engine, (Execution Engine 5) (2723) and updates counters reflecting the numbers of Job Threads and Execution Engines (2724) which completes the process (2725).

Process Architecture view of the Query Execution Process

When a Client Application connects to the EPDBMS, a connection is established with the EPDBMS. Each such connection is associated with a certain "state". Some common examples of such connection state are collation sequence, language, database localization settings, and transaction state.

FIG. 28 illustrates the query execution process and highlights the steps involved, as they relate to the process architecture.

The process begins with the receipt of a client connection request (2801). The Client Connection Manager (on the Controller Node) receives this connection (2802) and proceeds to validate the request (2803). If the request is invalid, an error is returned (2804). If the request is valid, we wait for a valid query/command. Parts of this processing (2805) are depicted in detail as part of FIG. 3. When a valid query/command is received, first determine whether the connection state is to be altered (2806). Some commands alter connection state as part of their execution, others alter connection state (and do nothing else), and others do not alter the connection state. If the connection state is to be altered, update the state (2807). A query execution plan is constructed (2808) and forwarded to the Query Execution Engine on the Controller Node (2809). The Query Execution Engine determines how many additional engines are required in the plan based on a variety of factors (2810). For example, if the plan is such that multiple operations in the plan can be performed at the same time, additional engines may be required. An example of these kinds of dependencies was provided as part of FIG. 22 (see description in paragraph [266] in the section on "Intra-Query Parallelism"). The Query Execution Engine determines what engines are available and currently not provisioned for some other query plan (2811) and determines whether there are sufficient free engines available (2812). If there are not sufficient engines then a determination is made whether additional engines can be launched on the machines currently available to the system (2813). If additional machines are needed, they are provisioned (2814), and additional engines are launched on those machines (2815). Finally, in step 2816, the additional engines required for the query plan are assigned to the plan, and state information about the connection is forwarded to those engines (2817). The engines execute the query plan and involve other resources such as the redistribution managers where appropriate (2818). Results from the query or an appropriate message are returned to the client (2819) and the final connection state is saved. If at the completion of query execution, engines can be released, they are released (2821 and 2822). If the system determines that an entire machine may be released (2823), then the machine is released (2824), and this concludes the query execution process (2825) and execution resumes at 2805 when a valid command/query is received.

The decisions in steps 2813, 2814, and 2824 are policy decisions that may be defined by the administrator based on a variety of factors including the cost and capabilities of machines available to the system.

In one embodiment, the administrator may define policies that define the maximum number of machines that may be provided at any time.

In one embodiment, the administrator may define the mechanism(s) to be used to determine whether existing machines can support additional engines.

In one embodiment, the system may record when a machine was provided and make a determination based on the cost(s) involved in retaining the machine for incremental time.

In one embodiment, mechanisms are implemented that will periodically scan for machines that can be released, and if appropriate release those machines.

As depicted in FIG. 28, execution engines involved in the execution of a query plan at the request of a client are made aware of all state related information, making it possible for engines to be released at the end of one query execution (2822) and provisioned again when required (2812 through 2816).

It should be understood that the example embodiments described above may be implemented in many different ways. In some instances, the various "nodes" described herein may each be implemented by a physical or virtual general purpose computer having a central processor, memory, disk or other mass storage, communication interface(s), input/output (I/O) device(s), and other peripherals. The general purpose computer is transformed into the nodes described above, for example, by loading software instructions into the processor, and then causing execution of the instructions to carry out the functions described for each node.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the node functions described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein that constitute a node are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the nodes. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A database management system comprising:
 a network interface, for receiving database queries from two or more client application processes as a network database service, the client application processes originating from two different users, the system providing a least one connection into the system for each such client application process;
 a group of two or more operational nodes for executing the queries as database operations, each operational node implemented as a logical collection of software components that execute on one or more physical machines;
 where the number of physical machines is not necessarily the same as the number of operational nodes;
 with the operational nodes assigned as controller-nodes, compute-nodes or storage-nodes, and groups of controller-nodes forming controller nodegroups, and groups of compute-nodes forming compute nodegroups, and groups of storage nodes forming storage nodegroups;
 the number of operational nodes, and their available assignment as compute-nodes or storage-nodes varying during execution of the queries;
 each client connection being assigned to an associated compute nodegroup;
 the queries also specifying one or more tables for an associated database operation, with each such table being assigned to a respective storage nodegroup where the data for the one or more tables is stored on the nodes that are part of the storage nodegroup;

where intermediate tables generated during query processing are assigned to the compute nodegroup associated with the client connection, and the data in those intermediate tables is stored on the nodes that are part of the compute nodegroup associated with the client connection; and the operational nodes further:

operating in parallel;

with the number of operational nodes executing a given query or queries changing during a given time interval by at least one of:

(a) changing the compute-nodegroup associated with a connection, or (b) adding or removing nodes from the compute nodegroup associated with a connection, the changing, adding, or removing nodes from the compute nodegroup occurring without requiring redistribution of data; and distributing data from the tables among the nodes in a storage nodegroup according to a data dependent distribution method specified by a Distribution Vector (DV), the DV including a set of attributes of the table that determine at least where each row is stored.

2. The system of claim 1 wherein the DVs each include a number of distribution columns and two DVs are considered comparable if the number of distribution columns in both DVs are the same, a corresponding distribution column in both DVs share a canonical representation, and the size of a binary representation of both the DVs is the same.

3. The system of claim 2 wherein two DVs are considered identical if they are comparable and their binary representations are identical.

4. The system of claim 1 wherein two rows originate from one table, or two rows originate from different tables associated with the same nodegroup, the data distribution method is data dependent, and when the rows have identical DVs, co-location is provided by storing the two rows on the same node in the nodegroup.

5. The system of claim 1 wherein if tables are distributed according to an Elastic Data Distribution (EDD) method, co-location is guaranteed when nodes are added to the nodegroup even without first redistributing data among the nodes in the nodegroup.

6. The system of claim 1 wherein a row is associated with a table that is distributed according to a data dependent distribution method, and a data distribution manager determined in which node to store the row.

7. A database management system comprising:

a network interface, for receiving database queries from two or more client application processes as a network database service, the client application processes originating from two different users, the system providing a least one connection into the system for each such client application process;

a group of two or more operational nodes for executing the queries as database operations, each operational node implemented as a logical collection of software components that execute on one or more physical machines;

where the number of physical machines is not necessarily the same as the number of operational nodes;

with the operational nodes assigned as controller-nodes, compute-nodes or storage-nodes, and groups of controller-nodes forming controller nodegroups, and groups of compute-nodes forming compute nodegroups, and groups of storage nodes forming storage nodegroups;

the number of operational nodes, and their available assignment as compute-nodes or storage-nodes varying during execution of the queries;

each client connection being assigned to an associated compute nodegroup;

the queries also specifying one or more tables for an associated database operation, with each such table being assigned to a respective storage nodegroup the operational nodes further:

operating in parallel;

with the number of operational nodes executing a given query or queries changing during a given time interval by at least one of:

(a) changing the compute-nodegroup associated with a connection, or (b) adding or removing nodes from the compute nodegroup associated with a connection;

distributing data from the tables among the nodes in a storage nodegroup according to a data dependent distribution method specified by a Distribution Vector (DV), the DV including a set of attributes of the table that determine at least where each row is stored; and when a row is associated with a table that is distributed according to a data dependent distribution method, a data distribution manager determines in which node to store the row; and wherein if a table is distributed according to an elastic data distribution, the data distribution manager stores a new row of data in a manner that ensures co-location by (a) computing a DV for the new row;

(b) determining whether this is a first occurrence of the DV associated with the nodegroup associated to the table, and (c) if it is the first such occurrence, the new row is stored on some node in the nodegroup, as determined by an Allocation Strategy (AS); else (d) if the DV has been seen before, the new row is stored on the same node that was used to store a row with the same DV before.

8. The system of claim 7 further comprising:

associating a Distribution Map (DM) with each nodegroup, such that the DM stores information tracking all DVs ever seen for any table in that nodegroup, and a location where the row associated with that DV was stored.

9. A database management system comprising:

a network interface, for receiving database queries from two or more client application processes as a network database service, the client application processes originating from two different users, the system providing a least one connection into the system for each such client application process;

a group of two or more operational nodes for executing the queries as database operations, each operational node implemented as a logical collection of software components that execute on one or more physical machines;

where the number of physical machines is not necessarily the same as the number of operational nodes;

with the operational nodes assigned as controller-nodes, compute-nodes or storage-nodes, and groups of controller-nodes forming controller nodegroups, and groups of compute-nodes forming compute nodegroups, and groups of storage nodes forming storage nodegroups;

the number of operational nodes, and their available assignment as compute-nodes or storage-nodes varying during execution of the queries;

each client connection being assigned to an associated compute nodegroup;

the queries also specifying one or more tables for an associated database operation, with each such table being assigned to a respective storage nodegroup the operational nodes further:

operating in parallel;

with the number of operational nodes executing a given query or queries changing during a given time interval by at least one of:

(a) changing the compute-nodegroup associated with a connection, or (b) adding or removing nodes from the compute nodegroup associated with a connection;

distributing data from the tables among the nodes in a storage nodegroup according to a data dependent distribution method specified by a Distribution Vector (DV), the DV including a set of attributes of the table that determine at least where each row is stored; and associating with each nodegroup one or more generations, such that when a nodegroup is initially created it has a first generation, and such that the generation consists of at least a generation number, a Distribution Map (DM), and an Allocation Strategy (AS).

10. The system of claim 9 wherein the AS determines where to send a row of data, and must be executable based on just the DV of the row, and any information in that generation.

11. The system of claim 9 wherein the latest generation of a nodegroup is a current generation of the nodegroup.

12. The system of claim 9 wherein the DM determines which DVs may not have been seen for the first time, when the associated generation was the current generation.

13. The system of claim 9 wherein when a change in the nodes belonging to a nodegroup, or a change in an Allocation Strategy, occurs, a new generation is created for the nodegroup.

14. The system of claim 9 wherein if a table is distributed according to an elastic data distribution, a new row of data is stored in a manner that ensures co-location by (a) performing an iterative search through all generations to determine an earliest generation where it cannot be determined for sure that the DV was not seen;

(b) if such a generation can be found, the new row is dispatched according to the allocation strategy in that generation; else (c) if such a generation cannot be found, it is determined that the DV was never seen before, and the new row is dispatched according to the Allocation Strategy in the current generation, and the DM for the current generation is updated to reflect the occurrence of the DV for the new row.

15. The system of claim 9 wherein when a new row is encountered with a DV that has never been seen before, the new row is stored, and an indication is made in the DM of the current generation that the DV has now been seen for the first time, in the current generation.

16. The system of claim 14 wherein a DV has a unique indication in the DM, but multiple different DVs may generate the same identification in the DM.

17. The system of claim 16 wherein as a result, it cannot be determined for sure whether a particular DV was seen before, but it can be determined whether a DV was not seen before.

18. The system of claim 1 wherein the operational nodes are further for:

adding a new node to a storage nodegroup;

identifying random and round-robin distributed tables associated with the storage nodegroup, and creating empty tables for these tables on the new node;

identifying broadcast distributed tables associated with the storage-nodegroup and creating and populating these tables on the new node;

identifying tables using Elastic Data Distribution (EDD) in the storage-nodegroup and creating empty tables for these tables on the new node;

creating a next generation for the storage-nodegroup;

populating an empty DM for the next generation of the storage-nodegroup;

updating the node member list for the new generation for the storage-nodegroup to include the newly added node;

updating the AS for the new generation;

updating and flushing the DM for the current generation;

informing all nodes in the storage-nodegroup of the new generation of the storage nodegroup; and updating the current generation of the storage nodegroup to be the newly created generation.

19. A database management system comprising:

a network interface, for receiving database queries from two or more client application processes as a network database service, the client application processes originating from two different users, the system providing a least one connection into the system for each such client application process;

a group of two or more operational nodes for executing the queries as database operations, each operational node implemented as a logical collection of software components that execute on one or more physical machines;

where the number of physical machines is not necessarily the same as the number of operational nodes;

with the operational nodes assigned as controller-nodes, compute-nodes or storage-nodes, and groups of controller-nodes forming controller nodegroups, and groups of compute-nodes forming compute nodegroups, and groups of storage nodes forming storage nodegroups;

the number of operational nodes and their available assignment as compute-nodes or storage-nodes varying during execution of the queries;

each client connection being assigned to an associated compute nodegroup;

the queries also specifying one or more tables for an associated database operation, with each such table being assigned to a respective storage nodegroup;

the operational nodes further:

operating in parallel;

with the number of operational nodes executing a given query or queries changing during a given time interval by at least one of:

(a) changing the compute-nodegroup associated with a connection, or (b) adding or removing nodes from the compute nodegroup associated with a connection; and wherein data from the tables is distributed among the nodes in a storage nodegroup according to a data dependent distribution method specified by a Distribution Vector (DV), the DV including a set of attributes of the table that determine at least where each row is stored; and further wherein each nodegroup is associated with one or more generations, such that when a nodegroup is initially created it has a first generation, and the generation consists of at least a generation number, a Distribution Map (DM), and an Allocation Strategy (AS), with the AS determining where to send a row of data, and executable based on the DV of the row, and any information in that generation, the Distribution Map (DM) being used to keep track of whether DVs have not been seen previously, and where when a change in the nodes belonging to a nodegroup, or a change in an AS occurs, a new generation is created for the nodegroup; and if a table is to be distributed according to an elastic data distribution, a new row of data is stored in a manner that ensures co-location by (a) performing an iterative search through all generations to determine an earliest generation where it cannot be determined for sure that the DV was not seen;

(b) if such a generation can be found, the new row is dispatched according to the allocation strategy in that generation; else (c) if such a generation cannot be found, it is determined that the DV was never seen before, and the new row is dispatched according to the AS in the current generation, and (d) the DM for the current generation is updated to reflect the first occurrence of the DV for the new row in the current generation.

\* \* \* \* \*